United States Patent
Cumoli et al.

(10) Patent No.: US 10,229,301 B2
(45) Date of Patent: Mar. 12, 2019

(54) OPTICAL CODE READING SYSTEM WITH DYNAMIC IMAGE REGIONALIZATION

(71) Applicant: Datalogic IP Tech S.r.l., Lippo di Calderara di Reno (BO) (IT)

(72) Inventors: Marco Cumoli, Monte San Pietro (IT); Filippo Malaguti, Bologna (IT); Francesco Piunti, Bologna (IT)

(73) Assignee: DATALOGIC IP TECH S.R.L., Lippo Di Calderara Di Reno, (Bologna) (IT)

( * ) Notice: Subject to any disclaimer, the term of this patent is extended or adjusted under 35 U.S.C. 154(b) by 142 days.

(21) Appl. No.: 15/038,565

(22) PCT Filed: Nov. 28, 2013

(86) PCT No.: PCT/IT2013/000332
§ 371 (c)(1),
(2) Date: May 23, 2016

(87) PCT Pub. No.: WO2015/079461
PCT Pub. Date: Jun. 4, 2015

(65) Prior Publication Data
US 2016/0300091 A1   Oct. 13, 2016

(51) Int. Cl.
*G06K 7/10* (2006.01)
*B65G 15/00* (2006.01)
(Continued)

(52) U.S. Cl.
CPC ......... *G06K 7/10732* (2013.01); *B65G 15/00* (2013.01); *B65G 47/493* (2013.01);
(Continued)

(58) Field of Classification Search
CPC ........... G06K 7/10722; G06K 7/10792; G06K 7/10762; G06K 7/0095; G06K 7/015;
(Continued)

(56) References Cited

U.S. PATENT DOCUMENTS 6,877,663 B2   4/2005   Kelly et al.
7,137,556 B1 * 11/2006   Bonner .............. G06K 7/10861
                                                235/462.08
(Continued)

FOREIGN PATENT DOCUMENTS

WO   20121172823 A1   9/2012

OTHER PUBLICATIONS

European Patent Office, Written Opinion and International Search Report issued in corresponding International Application No. PCT/IT2013/000332, dated Aug. 25, 2014, pp. 1-10.

*Primary Examiner* — Thien T Mai
(74) *Attorney, Agent, or Firm* — Duane Morris LLP

(57) ABSTRACT

In a method and system for acquiring image data for detection of optical codes located on objects carried by a conveyor system, a conveyor system has an imager that includes a sensor and an optics arrangement disposed with respect to the sensor to direct light from a field of view to the sensor so that the sensor outputs image data. A processor system receives image data. The processor system determines a position of an object in a field of view with respect to the conveyor's direction of travel, based upon the determined position of the object in the field of view, and upon a predetermined distance between the object and the optics, defines a region that bounds the image data at least with respect to the direction of travel, and that encompasses a position the object would have in the image data if the object is at the determined position in the field of view and at the distance from the optics, with respect to the object.

29 Claims, 17 Drawing Sheets

(51) Int. Cl.
*B65G 47/49* (2006.01)
*G06K 7/14* (2006.01)
*G06K 19/06* (2006.01)

(52) U.S. Cl.
CPC ..... *G06K 7/10445* (2013.01); *G06K 7/10722* (2013.01); *G06K 7/1413* (2013.01); *G06K 7/1417* (2013.01); *G06K 19/06028* (2013.01); *G06K 19/06037* (2013.01)

(58) Field of Classification Search
CPC .......... G06K 7/10861; G06K 7/10732; G06K 7/10445; G06K 7/1413; G06K 19/06037; G06K 19/06028; G06K 7/1417; B65G 47/493; B65G 15/00
See application file for complete search history.

(56) References Cited

U.S. PATENT DOCUMENTS

| | | |
|---|---|---|
| 8,322,621 B2 | 12/2012 | Olmstead |
| 8,459,556 B2 | 6/2013 | Zhou |
| 8,488,210 B2 | 7/2013 | Smith |
| 8,991,700 B2 | 3/2015 | Harbison et al. |
| 2005/0001035 A1* | 1/2005 | Hawley ............... G06K 7/10851 235/462.21 |
| 2009/0095047 A1* | 4/2009 | Patel ................. G06K 7/10722 73/1.01 |
| 2010/0177363 A1 | 7/2010 | Zhou |
| 2014/0029796 A1* | 1/2014 | Fiorini ............... G06K 7/10861 382/103 |
| 2015/0241457 A1* | 8/2015 | Miller ................. G06K 7/1092 348/143 |

\* cited by examiner

OPTICAL CODE READING SYSTEM WITH DYNAMIC IMAGE REGIONALIZATION

FIELD OF THE INVENTION

The present invention relates generally to devices and methods for acquiring data from images obtained by a device, such as a camera or other imaging device disposed above a moving conveyor, where the image has a multi-pixel depth at least in the conveyor's direction of travel, and assigning the acquired data to objects carried by the conveyor. Certain embodiments of the present invention relate to an imaging system, or associated method, having a one-dimensional or a two-dimensional array of optical detectors controlled in an imager to produce a two-dimensional image, where height data is used to define a subset of the two-dimensional image within which to locate optical code data, and that is configured to associate such located optical code with an object on the conveyor.

BACKGROUND

Optical codes, such as one or two-dimensional barcodes, are used in many applications, for example to identify objects, and/or their contents, being moved on a conveyor. The data acquired from these codes can be used within a tracking system to assure that, for example, proper manufacturing steps are applied to the object, or that the object is routed to a desired destination. But before these functions can be performed, it is first necessary to acquire an image from which the barcode can be identified, to identify the barcode, and to assign the located barcode to the correct object on the conveyor.

Various types of devices for reading optical codes may be used to acquire images of objects moving on a conveyor. Scanning devices, for example, may comprise an illumination beam that repeatedly sweeps across the conveyor surface and reflects back to an optical sensor. The beam may originate from a coherent light source (such as a laser or laser diode) or non-coherent light source (such as a light-emitting diode (LED)), but in any event, the optical sensor collects the light reflected from the conveyor and the objects thereon and outputs an analog waveform representative of the reflected light that may be digitized. As this data collects, and as the conveyor continues to move past the scanner, the collected data constitutes an image of the conveyor and the objects it contains. Moreover, because the light beam scans the conveyor, each bit of data from the reflected light can be associated with an angular position of the beam, and because the data corresponds to a beam, characteristics of the beam can be used to determine distance between the scanner and the reflection point. Angle and distance define a vector, and therefore each point in the resulting image can be associated with dimensional features of the conveyor and the conveyed objects. The height of each point in the image above the conveyor surface can be determined.

Optical code readers may also comprise camera devices that may in turn comprise an array of optical detectors and a uniform light source, such as an LED, used to illuminate the conveyor surface. The optical detectors may be charge-coupled devices (CCDs), complementary metal-oxide semiconductor (CMOS) devices, or other suitable devices, and they may be implemented in a one-dimensional or two-dimensional array. In operation, when light from the light source reflects from the conveyor surface or from the surface of an object carried by the conveyor, the array detects the reflected light to capture an image. Systems with one-dimensional arrays capture sequential linear cross-sections that collect to form a two-dimensional image, whereas two-dimensional arrays repeatedly capture two-dimensional images that change incrementally as the conveyor moves past the camera.

Once the image is acquired, it may be processed to determine whether any optical codes are present in the image and, if so, to locate such codes. Various techniques for locating optical codes in images are known and should be understood in this art. A first general step in known routines is to identify any portions of the image that correspond to objects upon which the presence of optical codes would be expected. Known location technique first examines the image to locate object edges or corners, and if sufficient edge or corner information exists, and passes certain criteria, that area of the image is determined to correspond to an object. Once an object portion of the image is identified, after processing to entire two-dimensional image, a routine may be implemented to locate optical codes, if any, that may be present within that image portion. In general such methods are based on preliminarily known characteristics of the codes, such as geometric configurations and the presence of consistent light/dark transition areas. Location techniques therefore tend to include methods for identifying these predictable characteristics, and for traditional one dimensional barcodes often include edge detection routines. As noted, these types of analytical techniques should be understood in this art, and the specific technique is not, in and of itself, part of the present invention.

Once the object and the code are identified in the image, it is then necessary to identify the corresponding object in the conveyor tracking system so that the code data can be associated with the object. At the point in the process described above, the reader may have acquired an image that may include an optical code, and as described in more detail below, the reader or a controlling system has information describing at least part of the optical code's position in space relative to the reader. Assume, for example, that the code's position in the reader's reference space is known. Assume, also, that the reader's position in a reference space defined with respect to the conveyor is known. Under these conditions, a processor in the reader (or another system processor to which the reader outputs the image, the image's position in the reader space, and a time reference indicating when the image was acquired) can translate the code's position in the reader's space to a position in the conveyor's space. The time reference can be any reference that normalizes events, for example with respect to a clock or to the conveyor's movement, so that such events can be compared. Such references, for example time stamps or tachometer signals that describe the conveyor's position, should be understood. If this processor, or another system processor to which the first processor outputs the optical code information, knows (a) the optical code's position in the conveyor's space, (b) the time reference corresponding to the image in which the code was acquired, (c) the positions (in the conveyor space) of objects being carried by the conveyor, and (d) time references corresponding to the objects' positions, the processor can identify the object on the conveyor to which the optical code corresponds.

A problem that can occur with such techniques, however, is that they can require significant processing time. Thus, as the desired conveyor speed increases, and therefore as the system's need to quickly process images to locate optical codes correspondingly increases, the rate at which the system can process images to locate optical codes can become a limiting factor for the overall system speed.

One way to reduce processing speed is to eliminate the need to locate the object's boundaries in the image, thus requiring the processor to search the image only for the optical code. In non-singulated systems (i.e. conveyor systems that operate under the assumption that objects on the conveyor can overlap in the conveyor's direction of travel), this generally requires that the conveyor system have sufficient dimensioning capability to determine a three dimensional profile (in conveyor space) of the objects, that the system know the position of objects (e.g. by use of a photoeye at known distances from both the dimensioning device and the reader, in conjunction with a tachometer or timer), that the system know the positions of the reader and the dimensioning device in the conveyor space, and that the reader provide sufficient information about the optical code's position that the code can be correlated to those profiles. A known system utilizes a three-dimensional dimensioner disposed at a known position in the conveyor space, along with a reader having a one-dimensional optical sensor (e.g. comprising a linear CCD array) and that is disposed so that the reader's linear field of view extends transversely to the conveyor's direction, across the conveyor, at a known distance from the dimensioner (in the conveyor's travel direction). As the dimensioner accumulates three dimensional profiles, the reader repeatedly sends its linear image data to the processor. Because of the speed at which the one-dimensional images must be acquired, the camera's depth of field is relatively short, and the system therefore utilizes an autofocusing lens, which can be controlled in response to the height data from the dimensioner. The one-dimensional images from the scanner accumulate to form a two-dimensional image, which the processor analyzes as a whole to locate optical codes. Following that, based on (a) timing, (b) the reader's and the dimensioner's known positions in the conveyor space, (c) dimensioner information, and (d) the optical code's location in the overall image, the dimensioner processor can associate the optical code from the reader with a given object detected by the dimensioner. As should be understood in the art, height detection can be particularly important where one dimensional sensors are used. Given the need to repeatedly acquire image data for accumulation, readers using one dimensional sensors use short exposure times, which in turn can result in an open diaphragm and relatively short depth of field. Thus, upstream height information can be used to determine the proper position for an autofocusing lens.

The need for three-dimensional profiling can be eliminated in singulated systems, i.e. conveyor systems that operate under the assumption that objects on the conveyor do not overlap in the conveyor's travel direction, because detection of the presence of an object on the conveyor establishes that the object is the only object on the conveyor during that time reference. For instance, assume a conveyor system has a photoeye directed across the conveyor, a tachometer that outputs pulses that correspond to the conveyor's speed and travel distance, and an optical code reader comprising a laser scanning device. The photoeye and the tachometer may output to the reader, or to another system processor that also receives the reader data. When the leading edge of an object breaks the photoeye's detection zone, the processor detects the event, creates a system record, and associates a tachometer count with a data item for the object's leading edge. That count increments with each subsequent tachometer pulse, so that as the leading edge moves with the conveyor further from the photoeye position, the record indicates, in terms of tachometer pulses, the distance between the object's leading edge and the photoeye. The processor similarly creates a data item in the record for the trailing edge, also accumulating tachometer pulses. Thus, at any time, the distances of the object's leading and trailing edges define the object's position on the conveyor with respect to the photoeye. A light curtain may still be used with one-dimensional CCD sensors, however, where needed to provide input data to adjust an autofocusing lens for the reader.

As noted above, a reader sensor's field of view may be angled with respect to the direction between the sensor and the conveyor belt. Thus, while the system knows the distances of all leading/trailing edge pairs of objects on the conveyor from the photoeye, the system cannot be sure that an optical code detected in a given field of view corresponds to a given object within the field of view unless the objects are spaced sufficiently far apart that it is not possible for two objects to simultaneously be within the same field of view. That is, knowledge of an optical code's position in the camera's image does not allow direct correlation of the code with an object within the field of view if there are more than one object in the field of view that could be in the same position as the code. Thus, in singulated systems it is known to maintain at least a minimum separation between object, based on an assumption of a maximum height of objects on the conveyor.

WO 2012/117283A1, the entire disclosure of which is incorporated by reference herein, discloses a system in which a reference dimension of the object (e.g. its length) is known or in which indicia of a predetermined size are placed on the objects, so that detection of the reference dimension in the image can be compared to the known actual reference dimension to thereby infer the object's distance from the camera. This distance can be translated to conveyor system space, and thereby correlated with a particular object, without need to directly measure the object's height.

U.S. application Ser. No. 13/872,031, the entirety of which is incorporated by reference herein for all purposes, discloses the use of a dimensioner in conjunction with scanner and imager data capture devices. It is known to detect information about the distance between an object and a two-dimensional imager using distance-measuring devices integrated or associated with the imager. It was also known that a light pattern projector may be used to project a pair of converging or diverging light figures or lines, with the object distance being obtained by measuring the distance in pixels between the lines or figures in the image acquired by the imager. Further, it was known to use a stereo camera, i.e., a camera having two or more lenses and a separate image sensor for each lens, to obtain a three-dimensional image.

SUMMARY

The present invention recognizes and addresses disadvantages of prior art constructions and methods. According to one embodiment, the present invention provides an imaging system having a frame and a conveyor system with a generally planar conveyor surface that is movable with respect to the frame in a direction of travel and operative to convey an object in the direction of travel, the object having an optical code associated therewith. The system also has at least one imager system in a position with respect to the frame that is fixed during movement of the conveyor surface in the direction of travel. The at least one imager system has an image sensor comprising an array of optical detectors, optics configured to focus light reflected from a field of view onto the image sensor, and a processor. The image sensor is configured to output data representative of an image of the field of view. The conveyor system outputs at least one signal representative of a position of the object with respect to the field of view. The processor is configured to receive the at least one signal representative of a position of the object with respect to the field of view, and determine a position of the object with respect to the field of view based on the at least one signal. Upon determining that the object is within the field of view, and based upon a predetermined distance between the object and the optics, the processor defines a region that bounds the data representative of the image at least with respect to the direction of travel, and that encompasses a position that the object would have in the data representative of the image if the object is at the determined position in the field of view and at the predetermined distance from the optics.

According to a further embodiment, the present invention provides a method of imaging objects on a conveyor system. The conveyor system has a generally planar conveyor surface that is movable with respect to a frame in a direction of travel, and the conveyor surface is operative to convey the objects in the direction of travel. The object has an optical code associated therewith and is spaced from the other objects in the direction of travel by a minimum gap. An imager system is provided in a position with respect to the frame that is fixed during movement of the conveyor surface in the direction of travel. The imager system has an image sensor having an array of optical detectors, optics configured to focus light reflected from a field of view onto the image sensor, and a processor. The image sensor is configured to output to the processor data representative of an image of the field of view. The conveyor system is configured to output at least one signal representative of a position of the object with respect to the field of view. The processor receives the at least one signal representative of a position of the object with respect to the field of view. The position of the object with respect to the field of view is determined based on the at least one signal. Upon determining that the object is within the field of view, and based upon a predetermined distance between the object and the optics, a region is determined that bounds the data representative of the image at least with respect to the direction of travel, and that encompasses a position the object would have in the data representative of the image if the object is at the determined position in the field of view and at the predetermined distance from the optics.

According to a still further embodiment, a system for acquiring image data for detection of optical codes located on objects carried by a conveyor system includes a conveyor system having a frame and a conveyor that defines a generally planar conveyor surface that is movable with respect to the frame in a direction of travel. An imager includes a sensor and an optics arrangement disposed with respect to the sensor to direct light from a field of view to the sensor so that the sensor outputs image data, wherein the imager is disposed with respect to the conveyor system so that the field of view extends above the conveyor surface and has a length in the direction of travel that varies with distance from the optics. A processor system receives the image data. The processor system determines a position of a said object in the field of view with respect to the direction of travel. Based upon the position of the object in the field of view, and upon a predetermined distance between the object and the optics, the processor system defines a region that bounds the image data at least with respect to the direction of travel, and that encompasses a position the object would have in the image data if the object is at the position in the field of view with respect to the direction of travel and at the predetermined distance from the optics.

In a still further embodiment, a system for acquiring image data for detection of optical codes located on objects carried by a conveyor system has a conveyor system with a frame, and a conveyor that defines a generally planar conveyor surface that is movable with respect to the frame in a direction of travel. The conveyor system outputs a first signal that corresponds to movement of the conveyor surface in the direction of travel. The conveyor system also has a detector disposed with respect to the conveyor system so that the detector detects presence of an object being carried by the conveyor surface in the direction of travel, the detector outputting a second signal carrying information indicating presence of the object. An imager has a sensor, and an optics arrangement disposed with respect to the sensor to direct light from a field of view to the sensor so that the sensor outputs image data. The imager is disposed with respect to the conveyor system so that the field of view extends above the conveyor surface and has a length in the direction of travel that varies with distance from the optics. A processor system receives the image data, the first signal, and the second signal. Based on the first signal and the second signal, the processor determines a position of an object in the field of view with respect to the direction of travel. Based upon the position of the object in the field of view, and upon a predetermined distance between the object and the optics, the processor defines a region corresponding to a projection to the sensor of the position the object would have in the field of view if the object is at the position in the field of view with respect to the direction of travel and at the predetermined distance from the optics, bounds the image data by the region and analyzes the bounded image data within the region to detect an optical code.

In a further embodiment, a method for acquiring image data for detection of optical codes located on objects carried by a conveyor system includes providing a conveyor system having a frame and a conveyor that defines a generally planar conveyor surface that is movable with respect to the frame in a direction of travel. The conveyor system outputs a first signal that corresponds to movement of the conveyor surface in the direction of travel. Presence of an object being carried by the conveyor surface in the direction of travel at an initial position is detected, the detector outputting a second signal carrying information indicating presence of the object. An imager is provided, having a sensor and an optics arrangement disposed with respect to the sensor to direct light from a field of view to the sensor so that the sensor outputs image data. The imager is disposed with respect to the conveyor system so that the field of view extends above the conveyor surface and has a length in the direction of travel that varies with distance from the optics. The imager receives the image data, the first signal, and the second signal. Based on the first signal and the second signal, a position of an object in the field of view is determined with respect to the direction of travel. Based upon the position of the object in the field of view, and upon a predetermined distance between the object and the optics, a region is defined corresponding to a projection to the sensor of the position the object would have in the field of view if the object is at the position in the field of view with respect to the direction of travel and at the predetermined distance from the optics, the image data is bounded by the region, and the bounded image data is analyzed within the region to detect an optical code.

Those skilled in the art will appreciate the scope of the present invention and realize additional aspects thereof after reading the following detailed description of preferred embodiments in association with the accompanying drawing figures.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
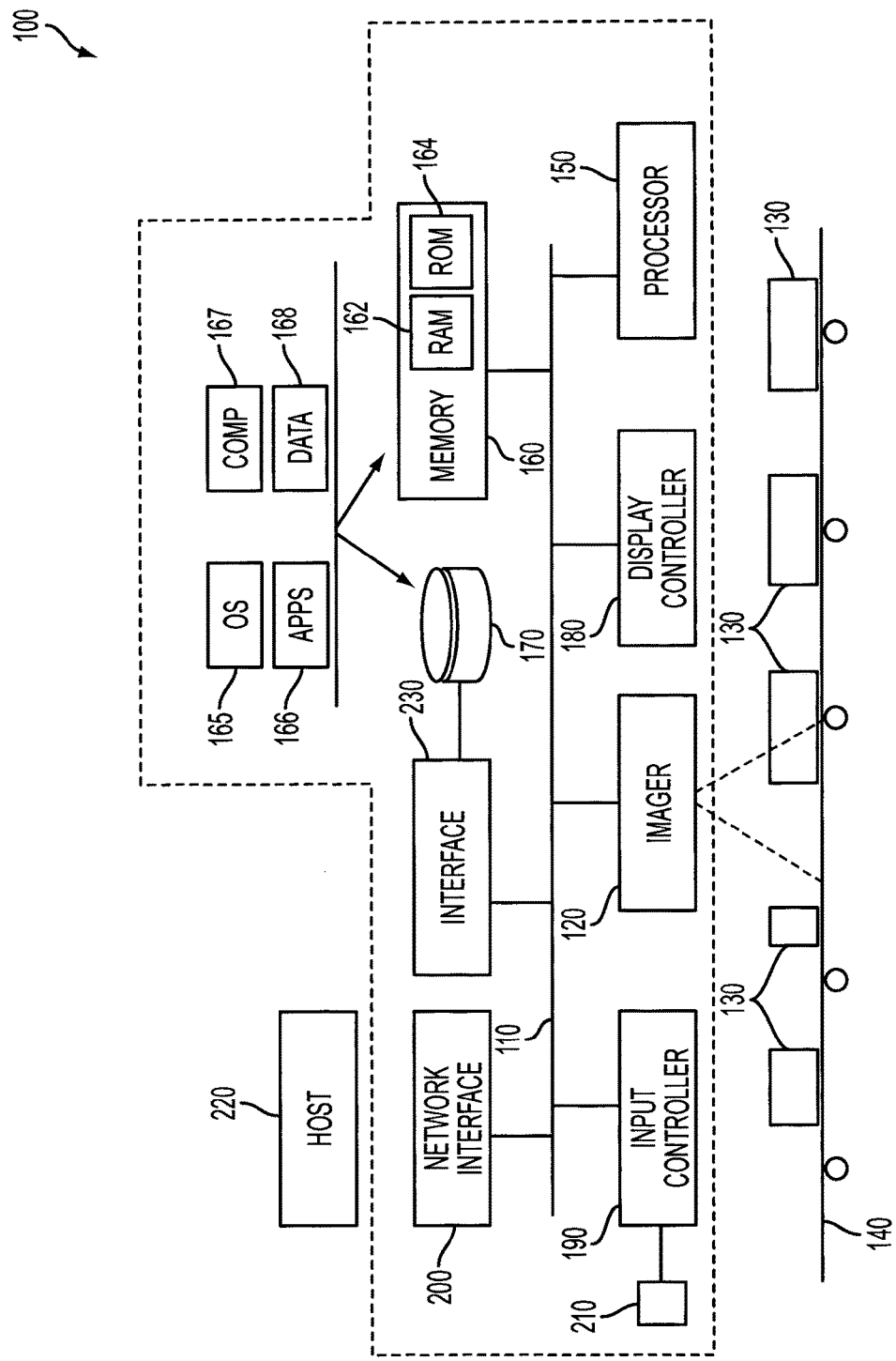
FIG. 1 is a block diagram of an imager system in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

In general, one or more embodiments of the present invention relate to an imager system that concentrates computational resources on the localization, recognition, and decoding of a graphic object of known characteristics in an image, by relying on extent (e.g. longitudinal, in the direction of a conveyor's travel, in some embodiments) information and assumptions regarding or measurements of object height. Although some preferred embodiments of the present invention are described below in the context of a single, downward-looking imager comprising a two-dimensional array of optical detectors, those skilled in the art should understand that the present invention is not so limited. In fact, it will be appreciated that embodiments of the present invention may be used with a system comprising multiple imagers of various orientations, for example disposed to the side of a conveyor so that the imagers read graphic objects on the sides of items the conveyor carries. Moreover, although several embodiments are described below in the context of optical code recognition on objects in the transport and logistics fields, those of skill in the art will appreciate that embodiments of the present invention may be useful in many different fields, including general manufacturing, automotive, pharmaceutical, food and beverage, and electronics industries, among others.

As used in the present disclosure, the term "optical code" refers to any graphic representation that can store data. One specific example of an optical code comprises a linear or two-dimensional code wherein data is coded by appropriate combinations of elements with a predetermined shape, such as a square, rectangle, or hexagon, of dark colors (normally black), separated by light elements (spaces, normally white), such as bar codes, stacked codes (including PDF417), Maxicodes, Datamatrix, QR codes, or color codes, etc. More generally, the term "optical code" further comprises other graphic forms with a data-storing function, including uncoded printed characters (letters, numbers etc) and specific shapes (patterns) (such as stamps, logos, signatures etc). The term "optical code" comprises graphic representations that are detectable not only in the field of visible light but also in the wavelength field comprised between infrared and ultraviolet. The term "pixel" refers to the smallest part of an electronically coded image and/or smallest individually addressable element of a sensor.

In certain presently-described embodiments, an imager system (such as a camera-based optical code reader system) having a one-dimensional or two-dimensional sensor is operated to generate a two-dimensional image of an area of the moving conveyor surface. The system tracks the positions of objects traveling on the conveyor, with respect to the conveyor's travel direction. When the system determines that an object is in the imager's field of view, the system defines a region of the image pixels defined by the sensor that is bounded in the conveyor's travel direction and analyses only the region pixels for optical codes, excluding pixels that are or would by defined by the sensor that are outside the region of interest (ROI). Use of the ROI allows the system to analyze a smaller image when location optical codes than would be otherwise necessary if analyzing the entire image that would be defined by the full range of sensor pixels.

The system defines the ROI based on a distance between the imager optics and the object on the conveyor. For top mounted imagers, this may also be considered in terms of the object's height, but the distance construct is more helpful when considering side-mounted imagers. In some embodiment, a minimum distance between the imager optics and the object is assumed for all objects (or, when discussing top-mounted imagers, a maximum object height). Use of an assumed distance/height as the predetermined height avoids the need to determine actual object height, thereby reducing processing requirements, hardware requirements, or both. But it should also be understood that the predetermined distance/height can be an actual, measured distance. One or more light curtains for example, may be disposed to measure the object's actual x and/or y dimension positions in conveyor space, thereby defining the distance in the x or y directions between the object and a side or top mounted camera, respectively. In such arrangement, therefore, the predetermined distance is an actual, rather than an assumed, distance, but in either case, the system dynamically defines ROI based on distance between the imager optics and the object. Use of actual light curtain data may be particularly appropriate when utilizing one-dimensional sensors to acquire two-dimensional images in an accumulating system, as height data may already be needed for auto-focusing. In certain presently-described embodiments, moreover and described below, the user defines both a minimum and maximum object height (or, a maximum and minimum distance between the imager optics and the object).

The system knows, through manual and/or automated calibration, the reader's orientation with respect to the conveyor system, so that image data may be translated from reader space to conveyor space. The system also knows the positions of objects on the conveyor, in terms of the conveyor space, and in particular with respect to the direction of object travel, i.e. the conveyor's travel direction. That is, the system tracks the objects in the conveyor's travel direction. The system also knows certain basic information about the reader's optical path, such as its viewing angle, and other optical parameters, such as magnification and focus distance.

As described below, this information is either determined prior to operation or is readily determined during operation. For example, the object position may be known during operation based on information from a position sensor and, in some embodiments, a tachometer. Information regarding the optical path of the reader and its position and orientation is determined or measured prior to operation. Likewise, a user of the system may specify the minimum (and sometimes maximum) distance between imager optics and the objects so that the distance(s) is/are known prior to operation.

Turning now to FIG. 1, a schematic representation of an imager system 100, including operational components thereof, is shown according to one embodiment of the present invention. Although a bus-based architecture, based on a bus 110, is illustrated in FIG. 1, other types of architectures are also suitable. For example, one or more of the components may be directly coupled to each other. Imager system 100 preferably includes at least one imager 120, which in the presently-described system may be a camera-based optical code reader having a one-dimensional or two-dimensional sensor array. The imager, or reader, has a field of view that extends over the conveyor surface. If a top mounted reader, the reader's field of view extends to the conveyor surface, whereas for a side mounted reader, the field of view may extend just over the conveyor surface without encompassing the conveyor surface itself. Reader 120 is configured to read optical codes associated with objects 130 conveyed by a conveyor system 140 in a singulated manner. Those of skill in the art will appreciate that various positions or configurations of the readers in imager system 100 may be employed. For example, although in many embodiments a reader 120 may be positioned in imager system 100 so that the reader's field of view extends between the reader and a top of the conveyor surface, and of objects on the conveyor surface, i.e. typically in a position above the conveyor, reader 120 may be disposed in other positions, e.g. on either side of the conveyor, so that the reader's field of view is above but aligned laterally to the conveyor. In such configurations (e.g. when the reader's optical axis is within a plane generally parallel to the plane of a planar conveyor surface), the object "maximum height," which term is used for convenience in discussing embodiments in which the reader is disposed above the conveyor surface (such that the reader's optical axis is generally within a plane that is perpendicular to the conveyor surface plane), can be considered in terms of a minimum distance between the reader optics and the object, when the object is disposed on the conveyor surface. That is, references to maximum height and minimum distance are different descriptions of the same effective parameter.

Imager system 100 may include any number of other components that interface with one another via bus 110, including a processor 150, memories 160 and 170, a display controller and display device 180, an input controller 190, and a network interface 200. Other embodiments of imager system 100 may omit one or more of these components, may contain additional components, or both. Processor 150 may be any commercially available processor or other logic machine capable of executing instructions, such as a general-purpose microprocessor or a digital signal processor (DSP). Additionally, more than one processor may be provided. Processor 150 may be readily programmable; hardwired, such as an application specific integrated circuit (ASIC); or programmable under special circumstances, such as a programmable logic array (PLA) or field programmable gate array (FPGA), for example. Program memory for the processor 150 may be integrated within the processor 150, may be part of the memories 160, 170, or may be an external memory. Processor 150 executes one or more programs to control the operation of the other components, to transfer data between the other components, to associate data from the various components together (preferably in a suitable data structure), to perform calculations using the data, to otherwise manipulate the data, and to present results to the user. For example, processor 150 may execute an algorithm that defines a region of interest that defines a subset of image pixels defined by the sensor of imager 120, based on information about the position of an object 130 on the conveyor, locates the optical code within the region of interest, and then associates the located optical code with its corresponding object 130. Alternatively, the locating and/or associating steps may be performed by another system processor to which processor 150 outputs image data. Accordingly, the processor system described herein may comprise the imager processor and/or other processors operated as part of the larger system. Preferably, the region of interest corresponds to a single object 130, even though more than one object 130 may be present in the image. Additional details of this algorithm are discussed in more detail below.

Display controller and display device 180 may optionally be provided to present data, menus, and prompts, and otherwise communicate with the user via one or more display devices, such as a transmissive or reflective liquid crystal display (LCD), cathode ray tube (CRT) display, or other suitable display.

Input controller 190 may be configured to receive user input from a keyboard, a pointing device, or other wired/wireless input devices. According to one embodiment, input controller 190 comprises a universal interface driver application specific integrated circuit (UIDA). Further details of the UIDA can be found in U.S. Pat. No. 6,877,663, which is hereby incorporated by reference in its entirety for all purposes. Other input devices may be included, such as a microphone, touchscreen, touchpad, and trackball. While the input devices may be integrated into imager system 100 and coupled to processor 150 via input controller 190, input devices may also connect via other interfaces, such as a connector 210. Connector 210 may include one or more data interfaces, bus interfaces, wired or wireless network adapters, or modems for transmitting and receiving data. Accordingly, input controller 190 may include one or more of hardware, software, and firmware to implement one or more protocols, such as stacked protocols along with corresponding layers. Thus, connector 210 may function as one or more of a serial port (e.g., RS232), a Universal Serial Bus (USB) port, and an IR interface. Input controller 190 may also support various wired, wireless, optical, and other communication standards.

Network interface 200 may be provided to communicate with one or more hosts 220 or other devices (e.g., a computer, server, or terminal) associated with system 100. For example, data gathered by, or decoded by, imager 120 may be passed along to host 220. Host 220 may present data, prompts, and otherwise communicate with the user via one or more display devices. For example, host 220 may present decoded data to the user via a display, such as an object type (e.g., product type) corresponding to an imaged optical code and data associated with the object type (e.g., a price of the product). The data associated with the object type may be encoded in the optical code or accessed from a local or remote database based upon the object type. By way of another example, host 220 may cause the decoded data to be recorded on a tangible medium. In particular, host 220 may instruct a printer to print the object type and data corresponding to the object type (e.g., print the product type and associated price on an invoice or shipping label). Host 220 may be any machine that manipulates data according to a list of instructions. For example, host 220 may comprise a mobile device, server, personal computer, or embedded computer. Network interface 200 may facilitate wired or wireless communication with other devices (and with the host) over a short distance (e.g., via Bluetooth™) or nearly unlimited distances (e.g., via the Internet). In the case of a wired connection, a data bus may be provided using any protocol, such as IEEE 802.3 (Ethernet), advanced technology attachment (ATA), personal computer memory card international association (PCMCIA), and USB. A wireless connection may use low or high powered electromagnetic waves to transmit data using any wireless protocol, such as Bluetooth™, IEEE 802.11b (or other WiFi standards), infrared data association (IrDa), and radiofrequency identification (RFID), among others.

Imager system 100 may include memory 160, which may be implemented using one or more standard memory devices. Such memory devices may include, for instance, RAM 162, ROM 164, and EEPROM devices, and may also include magnetic or optical storage devices, such as hard disk drives, flash memory, CD-ROM drives, and DVD-ROM drives. Imager system 100 may also include an interface 230 coupled to an internal hard disk drive 170. In addition, interface 230 may also be coupled to a magnetic disk drive, an optical disk drive, or another drive and may be configured for external drive implementations, such as over a USB, IEEE 1194, or PCMCIA connection.

According to one embodiment, any number of program modules are stored in the drives (e.g., drive 170) and ROM 164, including an operating system (OS) 165, one or more application programs 166, other program modules 167 (e.g., instructions to implement the methods described below), and data 168. All or portions of the program modules may also be cached in RAM 162. Any suitable operating system 165 may be employed. The program modules 167 may comprise one or more sets of instructions to implement the object—code association processing that is described in more detail below.

Other embodiments of imager system 100 may have fewer than all of these components, may contain other components, or both. In a preferred implementation, imager system 100 comprises an image based data capture device, such as the Matrix 450™ imager offered by Datalogic Industrial Automation S.r.l. of Bologna, Italy. Imager system 100 may also comprise other types of data capture devices, such as a portable scanner.

Figure 2:
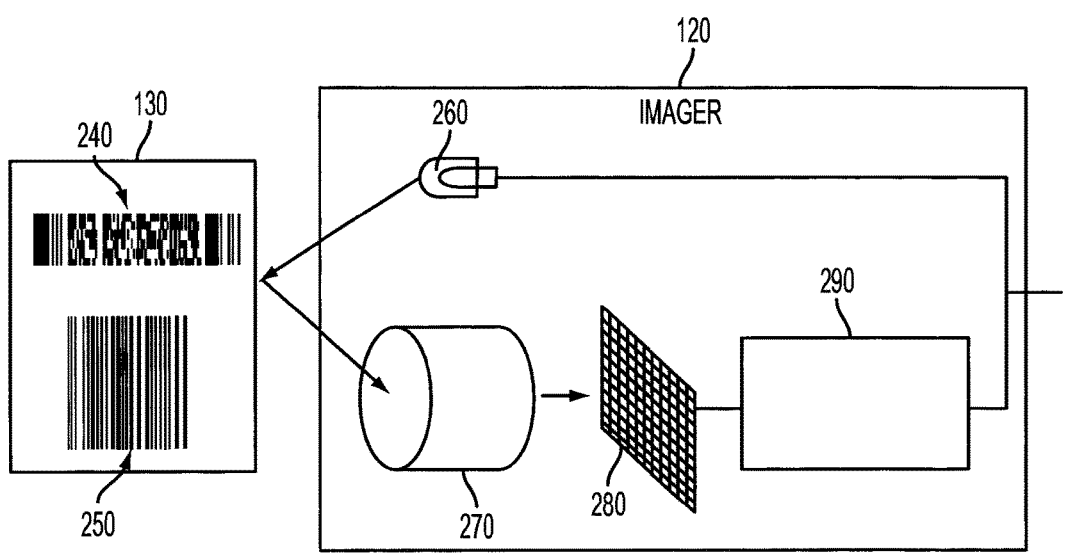
FIG. 2 is a block diagram of an imager which may be used with the imager system of FIG. 1 in some embodiments of the present invention.

FIG. 2 is a schematic representation of imager 120 according to one or more embodiments of the present invention. As noted above, imager 120 is used to produce an image of objects 130 as they pass imager 120 on conveyor system 140. Object 130 may be any object, but in one implementation, object 130 is a box upon which is printed an optical code, such as optical code 240 (which in this example is a PDF417 barcode) and optical code 250 (which here is a Code 128 barcode). Imager 120 may comprise an illumination source 260, a lens assembly 270, an image sensor 280, and a signal processor 290. Imager 120 may comprise other components not illustrated or may omit certain components illustrated, such as the illumination source 260 and thus rely on ambient light. Illumination source 260 may comprise any suitable source of light, such as a row of light emitting diodes (LEDs), flash strobes, or incandescent or fluorescent lamps.

Lens assembly 270 may comprise one or more lenses for focusing light on image sensor 280. For example, lens assembly 270 may comprise a single optical element or may comprise an array of optical elements with a common axis. Lens assembly 270 may also comprise an autofocus/zoom lens coupled to processor 150 to control focus distance and/or an amount of optical zoom. Image sensor 280 forms an electronic image of object 130. Image sensor 280 may comprise a wide range of image sensing devices for converting an optical (or another wavelength range in the electromagnetic spectrum) image into an electrical signal. For example, image sensor 280 may be a two-dimensional digital sensor, such as a charge-coupled device (CCD) or complimentary metal-oxide semiconductor (CMOS) sensor, which forms a two-dimensional array of pixels, which together capture an electronic representation of the image. Further, the sensor may be a one-dimensional digital sensor, such as a CCD device in which a single row of pixels extend across the conveyor surface in the x direction, perpendicular or at an angle with respect to the conveyor's travel direction. Each pixel location may store data indicative of the light intensity at that location of the image. The light intensity data for each pixel may be a color-coded vector (e.g., red-green-blue) or monochrome intensity (e.g., grayscale).

As noted, some embodiments described herein utilize sensors having one-dimensional or two-dimensional arrays. A two-dimensional image sensor 280, after having been exposed to light reflected by an object 130, may output data from all pixels in the 2D array sequentially in a selectable pattern (which may be row-by-row, column-by-column, or some other pattern) in response to a command from processor 290 to the sensor via one or more command lines (the command identifying a window start pixel (row/column, horizontal size information, and vertical size information). The result is data representing a two-dimensional image. To bound the image data, processor 290 may determine the ROI (as discussed below) and then issue appropriate commands to the 2D sensor so that only those sensor pixels corresponding to the region of interest output image data, so that only the image data from those sensor pixels is available to be analyzed by the processor for an optical code to associate with the corresponding object on the conveyor surface. Alternatively, the processor may instruct that the data for the two-dimensional array may be read out for all sensor pixels, but because the sensor image data can be associated with the sensor pixels from which it is obtained, the processor is able then to analyze only a subset of the overall sensor pixel data for optical codes for a given object on the conveyor, according to the region-of-interest determined by processor 290 and/or other system processor, described below. Where the sensor is a linear sensor defining only a single row of pixels extending in the x direction across the conveyor surface, perpendicular to the conveyor's travel direction, processor 290 may instruct the sensor row to activate successively at a timing corresponding to the conveyor's speed, so that the sensor produces a two dimensional image from the successive row images. In such embodiment, the processor may activate the row a number of times that is limited so that the sensor acquires an image that is limited in the y direction to the ROI, determined as discussed below. The imager processor delays the sensor's activation for a period of time that would otherwise have been sufficient for the sensor to generate image data having a length in the y direction equal to a number of sensor pixels defined by the ROI beginning boundary. The sensor array is then activated for a time sufficient to acquire image data having a length in the y direction equal (in terms of sensor pixels) to the ROI length. Alternatively, the processor may instruct the single row to always acquire a certain number of row images, resulting in a consistent two dimensional image (assuming a constant conveyor speed or an automated adjustive correlation between the sensor row's activation rate and conveyor speed), and then only analyze a subset of that pixel data for optical codes for a given object on the conveyor, according to the region-of-interest determined by processor 290 and/or other system processor.

In a still further embodiment, a single row sensor is disposed in the x-y plane, at an angle with respect to the x axis (i.e. so that the single row has a dimension in both the x and y directions). The angled (in the x-y plane) linear sensor is not operated to build a two dimensional image. Rather, when an object is within the imager's field of view, the controlling processor repeatedly, at predetermined time intervals, activates all detectors in the sensor so that the sensor repeatedly outputs single-line image data. The processor then analyzes each line of data to locate an optical code only in a region bounded in the y direction to the ROI, determined as discussed below.

Regardless how it acquires the ROI-limited image, however, signal processor 290 conditions the data received from the image sensor 280 and may generate an output that generally identifies which regions of the image correspond to light areas and which correspond to dark areas. For example, signal processor 290 may set the exposure time, gain, and possibly thresholding so that the bars or relatively darker regions of the barcode or other target are reported as being dark, and the spaces or relatively lighter regions between the bars or darker regions are reported as being light, according to any of a number of techniques. Either analog or digital signal processing may be utilized in signal processor 290. As noted above, processor 290 may execute a software routine to identify optical codes from this data, using any of several well-known techniques that are not, therefore, discussed in detail herein. While image sensor 280 and signal processor 290 may be at least partly contained in the same integrated circuit as the sensor array, other configurations are possible. For example, signal processor 290 may be implemented by processor 150 (FIG. 1) or one or more other logic machines capable of executing instructions.

Figure 3:
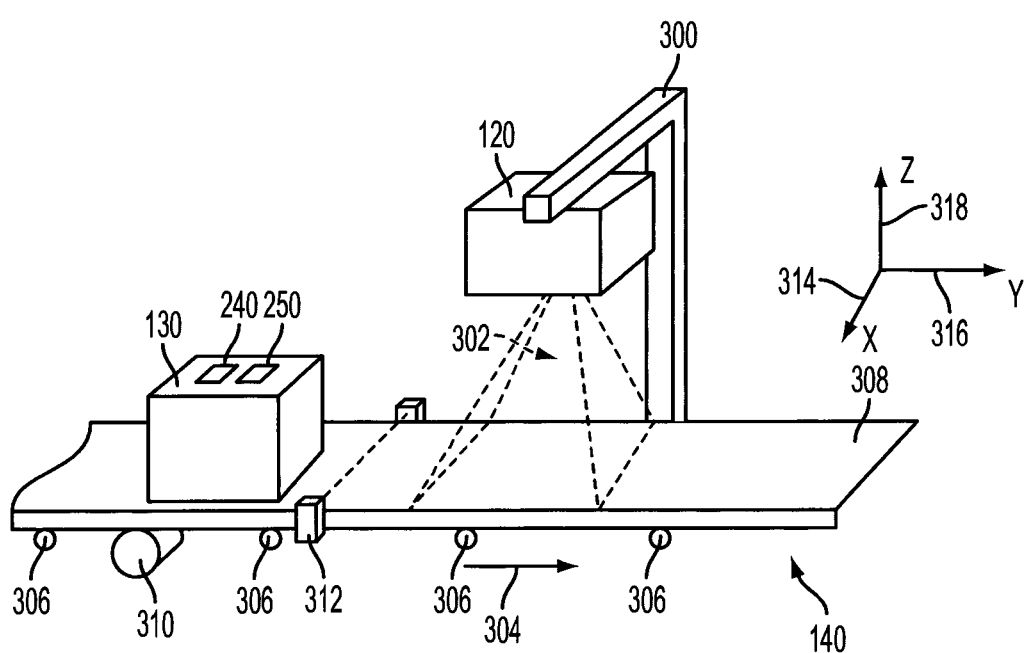
FIG. 3 is a schematic representation of a portion of the imager system of FIG. 1 according to one embodiment of the present invention.

FIG. 3 is a schematic representation of a portion of imager system 100 according to one embodiment of the present invention. As shown, imager 120 is preferably positioned in a downward-facing orientation over conveyor system 140 such that the optical axis of lens assembly 270 is substantially perpendicular to conveyor system 140. (As discussed in more detail below, in some embodiments, although imager 120 may still face conveyor system 140, the optical axis of lens assembly 270 may be skewed, and thus not perpendicular to the conveyor surface). Imager 120 may preferably be coupled with a frame 300 by suitable mounting hardware, such as a mounting bracket, and thus imager 120 is fixed with respect to conveyor system 140.

A field of view 302 of imager 120, which may be the area of inspection captured by image sensor 280, is directed above the conveyor system and covers a portion of conveyor system 140. As shown, field of view 302 may define a substantially pyramidal imaging volume through which objects 130 may pass as conveyor system 140 conveys objects 130 in the direction shown by arrow 304. In the embodiment shown in FIG. 3, field of view 302 covers the entire width of conveyor system 140, though this is not required. As objects 130 pass through field of view 302, imager 120 is configured to produce an electronic image of objects 130 and decode information represented by optical codes 240, 250, as discussed above.

Conveyor system 140 may comprise a plurality of rollers 306, a belt 308, a tachometer 310, and a position sensor 312. Those skilled in the art will appreciate, however, that conveyor system 140 may move objects 130 along the direction of travel by means other than belt 308, for example by driven rollers. Even where beltless rollers are used, it will be understood that the beltless rollers define a conveyor surface that moves in the conveyor system's direction of travel. Rollers 306 may be motor-driven rollers which move belt 308 in the direction shown by arrow 304. For purposes of the present discussion, the direction corresponding to the start of conveyor system 140 will be referred to as "upstream," whereas the direction in which belt 308 moves will be referred to as "downstream."

Conveyor system 140 may preferably have a coordinate system, or frame of reference, defined with respect to a known position, such as the position sensor. The frame of reference may comprise an x-axis 314, a y-axis 316, and a z-axis 318. The direction of travel of belt 308 is parallel to y-axis 314, while the optical axis of lens assembly 270 may be parallel to or skewed from z-axis 317. X-axis 314 extends perpendicular to belt 308. Imager 120 may preferably be positioned from tachometer 310 a distance in the y-axis 316 direction that is known in system 100 (for example, by imager 120 and/or host 220). Likewise, position sensor 312 may preferably be positioned from tachometer 310 a distance in the y-axis 316 direction that is known in system 100. For example, these distances may be stored in one of memories 160 or 170.

In one implementation, tachometer 310 may be beneath and in contact with the surface of belt 308 and rotate as belt 308 moves in the direction of arrow 304. As tachometer 310 rotates, it outputs a signal comprising a series of pulses corresponding to belt 308's linear movement and speed. Tachometer 310, and other devices which provide signals corresponding to the movement, including rate of movement, of a conveyor belt and from which the locations of objects moving in a direction of travel along the belt can be determined, should be understood by those of skill in the art. In general, the number of pulses output by tachometer 310 corresponds to the linear distance traveled by belt 308, while the pulse frequency corresponds to the speed of belt 308. The number of tachometer 310 pulses per unit of measurement defines the tachometer's resolution and its ability to precisely measure the distance an object 130 has moved on belt 308. In other embodiments, tachometer 310 may be replaced by a shaft encoder, as those of skill in the art will appreciate. In yet other embodiments, tachometer 310 may not be included at all, for example where the speed of belt 308 is constant. In such embodiments, the system can determine distance by monitoring time between events (recorded in object records as time stamps) and multiplying elapsed time against the constant belt speed.

Position sensor 312 is preferably fixed with respect to conveyor system 140 and oriented parallel to x-axis 314 upstream of imager 120. Position sensor 312 is configured to detect the presence of (e.g., the leading and trailing edges of) objects 130 as they pass position sensor 312 on belt 308. In one preferred embodiment, imager system 100 may be configured for use in singulated systems, or systems designed to track singulated objects. By singulated, it is meant that the objects are positioned on a conveyor in a serial fashion such that the objects do not overlap in the direction of travel. Thus, the objects may be easily distinguishable by position sensor 312. Those of skill in the art should be familiar with position sensors suitable for this purpose. In one embodiment, position sensor 312 may be a photoelectric sensor having a sensor line 320 oriented across belt 308 in a direction parallel with the x-axis.

Object records are used to track objects 130 moving through system 100. More particularly, when the leading edge of an object 130 moving along belt 308 interrupts sensor line 320 of position sensor 312, the output of position sensor 312 (which is directed to imager 120), goes high and stays high until the back of the object 130 passes the position sensor, at which point the position sensor's output goes low. As noted above, imager 120 also receives data from tachometer 310 and therefore knows the count of tachometer 310 at the times position sensor 312 detects the leading (rising signal from the position sensor) and trailing (falling signal from the position sensor) edges of object 130 are detected at by imager 120 from the output of position sensor 312. More specifically, when the processor of imager 120 detects a rising signal from position sensor 312, the processor opens an object record, which is stored in one or both of memories 160 and 170, and stores in that record the present tachometer value as the object's leading edge value, Nlead (alternatively, e.g. in a system having a constant belt speed, Nlead may be a time stamp corresponding to the time at which the leading edge passes the photosensor). Because the processor also knows the number of tachometer pulses that will occur when the conveyor surface moves sufficiently to move an object the distances between the photosensor and the beginning and the end of the field of view, the processor also stores two values in the record, in association with Nlead, one equal to Nlead+pulses to the field of view beginning, and one equal to Nlead+pulses to the field of view end (or, alternately, time stamps corresponding to the time it would take the leading edge to travel from the photosensor to the imager FOV, at the belt's constant speed). Thus, when the tachometer output (or clock output) is within these two numbers, the object's leading edge is within the field of view. When the imager processor detects the next falling edge signal from position sensor 312, the processor stores the then-present tachometer value as the object's trailing edge value, Ntrail, and determines and stores two additional values corresponding to Ntrail+pulses to beginning of field of view and Ntrail+pulses to end of field of view (or, as discussed above, time stamps), so that the when the tachometer output (or clock output) is within the two additional numbers, the object's trailing edge is within the field of view. Imager 120 monitors the tachometer output as it successively increments, and at each increment compares the tachometer value with each open object record to see if it falls within the bounds of the two numbers calculated for each Nlead and Ntrail in each open object record. If either condition is true for any open object record, the processor instructs the sensor to acquire an image, in any of the various embodiments described above or other embodiments, based on the ROI, either through hardware control of sensor acquisition or selection of a pixel subset within a larger pixel area of the initial image data. In some embodiments, the processor will begin image acquisition only when the tachometer comparison indicates that the object extends within the field of view by at least a predetermined distance (e.g. as determined by a tachometer value threshold). The extent of the predetermined distance can be selected as desired, but in one embodiment is at least a distance that corresponds to the width of an optical code expected to be located on the object. Moreover, it will be appreciated that the particular method used to track or locate the object's presence in the field of view can vary, and those skilled in the art should understand that other methodologies can be used and that the presently described method is provided for purposes of example only. Where tachometer pulses are used to trigger this analysis, it is preferable that image data be output from the sensor before the next tachometer pulse, but it is possible to only trigger the procedure upon some multiple tachometer pulses. Where time stamps are used, the processor programming can be configured to trigger the procedure upon a predetermined time interval.

As described in more detail below, when determining the ROI, the processor relies on the actual positions of the object's leading and trailing edges with respect to the field of view. Thus, each time conditions exist such that the imager acquires an image, the processor also determines and updates variables (Plead and Ptrail) in each open object record corresponding to the respective object's leading (Plead) and trailing (Ptrail) edges with respect to the imager's field of view. More specifically, upon determining that any object is at the field of view, the then-current tachometer value (or, alternatively, a time stamp) is stored as a variable, Nshot. For a given object record, Plead=Y0+(Nshot−Nlead)*ΔY, and Ptrail=Y0+(Nshot−Ntrail)*ΔY, where Plead is the updated position value for the object leading edge, Ptrail is the updated position value for the object trailing edge, Y0 is the position (in a linear distance measurement, e.g. inches or millimeters, with respect to some predetermined constant position in the conveyor path) of the position sensor in the conveyor path (e.g. may be assumed=0, meaning that Y0 is the zero point), and ΔY is the distance (in the same linear distance measure, e.g. inches or mm, as Y0) per tachometer increment. Since Nshot, Nlead, and Ntrail are all tachometer values (or, in another embodiment, time stamps), Nshot-Nlead and Nshot-Ntrail are tachometer values (or time stamps), which ΔY converts to a linear distance. As Y0 is a linear distance from a predetermined point in the conveyor path, these equations result in distances of the leading and trailing edges of the given object from that predetermined point, at the moment an image is acquired. Assuming Y0=0, then, Plead and Ptrail are the respective distances of the object's leading and trailing edges from the position sensor at the moment a given image is acquired. Whenever the imager processor acquires an image, and thus recalculates Plead and Ptrail for each open object record, the imager processor saves the recalculated values in the respective object records, until the next image acquisition. As described below, the processor also determines the ROI for the portion of the image corresponding to the object, given that Plead and that Ptrail. The processor updates the ROI at each image acquisition, but preferably only for the object record(s) corresponding to objects in the field of view. In another embodiment, the processor updates Plead and Ptrail also only for the object record(s) for which the analysis described above indicates that the corresponding object is within the field of view.

Preferably, system 100 also knows a predetermined system transmit point, e.g. in terms of the number of tachometer pulses between the photosensor and the transmit point. Upon setting up the object record, the processor may also store a third variable in association with each of Ntrail, equal to Ntrail+pulses to transmit point. The transmit point may be defined in terms of distance, for example in tachometer 310 pulses or in linear distance, from position sensor 312 to a point sufficiently downstream of imager 120 that the trailing edge of the largest object system 100 is expected to carry will have cleared field of view 302 of imager 120 (and, if applicable, the fields of view of any other data capture devices present in system 100) by the time the object's leading edge reaches the transmit point. When, following creation of a particular object record, system 100 determines that the then-current tachometer value is greater than Ntrail+pulses to the transmit point, then the object corresponding to the object record for this Ntrail value has completely passed the transmit point in its travel along the conveyor. System 100 then closes the respective object record and transmits the object record data to host 220. Host 220 may then process this data as discussed above.

Figure 4:
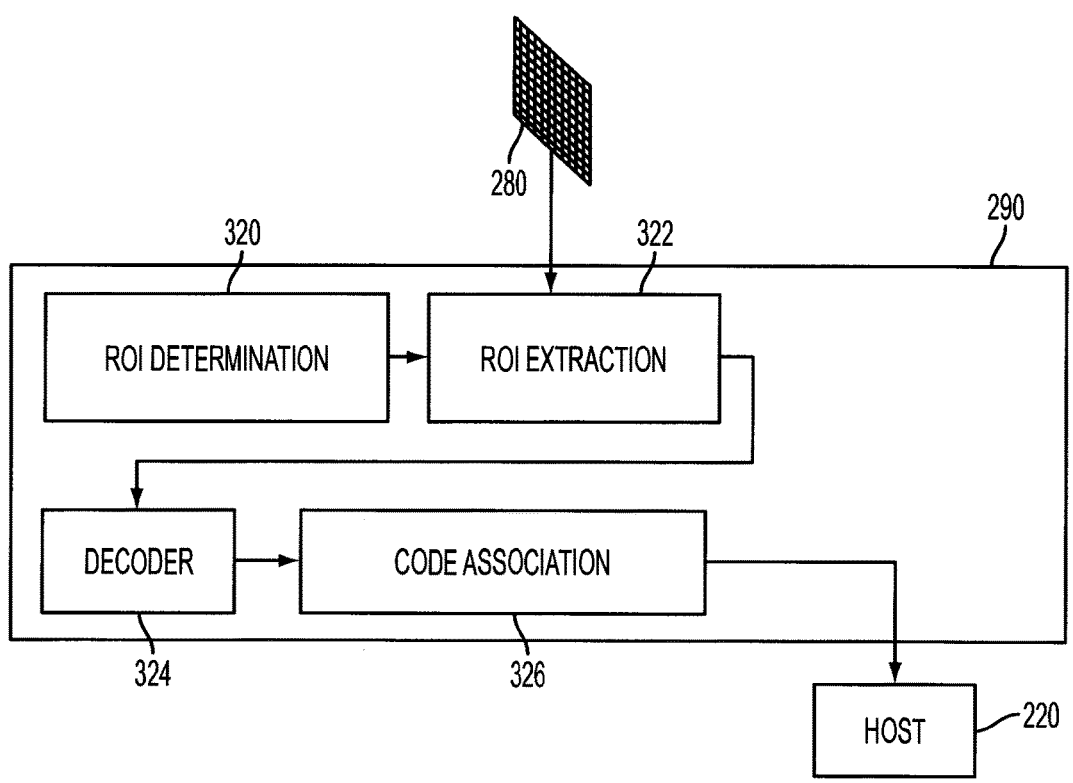
FIG. 4 is a block diagram illustrating a processor implementing or executing various components or modules in accordance with one embodiment of the present invention.

FIG. 4 is a block diagram illustrating signal processor 290 of imager 120 implementing or executing various components or modules, according to one or more embodiments of the present invention. Preferably, only regions described herein as regions of interest (ROI), of the image pixels defined by the sensor that are bounded in the conveyor's travel direction (e.g. by selective hardware actuation of sensor pixels or by selection of image pixel data drawn from a larger sensor area) are processed to locate and decode optical codes on objects 130. In part, and as discussed in detail below, the ROI(s) may be determined based on a predetermined maximum height (in other words, a predetermined minimum distance from the imager optics) for each object 130, e.g. by assuming a constant predetermined distance, which may be specified in advance by a user, for all objects or by determining a respective actual height/distance (e.g. by a light curtain aligned parallel to the imager's optics line and disposed upstream from the imager) for each object as it passes a point upstream from the imager. Optionally, a predetermined minimum ROI may be stored in a memory, such as one of memories 160, 170, such that if the dimension in the conveyor's travel direction is shorter than the predetermined minimum ROI, that dimension in the actual ROI is set to the predetermined minimum ROI dimension. In this regard, signal processor 290 may first execute an ROI determination module 320, by which signal processor 290 may determine one or more dynamic ROIs within an image captured by image sensor 280. Additional details of various methods and algorithms used to implement ROI determination module 320 will be described in more detail below. ROI determination module 320 may comprise hardware or firmware. Additionally or alternatively, ROI determination module 320 comprises software or a set of instructions stored in a memory, such as memories 160 and 170.

Signal processor 290 may then execute a ROI extraction module 322 to read or assemble samples or pixels from image sensor 280. Those skilled in the art should be familiar with methods by which image data may be exchanged between an image sensor and a processor. According to a preferred embodiment, all of the data corresponding to an image captured by image sensor 280 is extracted, and then signal processor 290 may then discard or disregard those portions of the image which do not correspond to the ROI(s) determined by ROI determination module 320. In another embodiment as described above, based on the ROI(s) determined by ROI determination module 320, processor 290 may cause image sensor 280 to directly acquire one or more ROIs by selectively activating sensor pixels corresponding to the ROI, rather than larger image. For example, once one or more ROIs have been determined, processor 290 may utilize windowing capabilities of a CMOS image sensor 280 to limit activation to those sensor pixels corresponding to the license.

It will be appreciated that, by using ROI(s) for the search for optical codes, rather than analyzing a full (in the case of a 2D sensor) or otherwise larger (in the case of a 1D sensor) image captured by image sensor 280, the time required to process an image decreases, more images per unit time may be taken, and thus more attempts at locating and reading an optical code may be made. This consideration may be particularly important in fixed focus systems, where resolution changes significantly at extreme positions within the imager's depth of field, and a higher number of reading attempts per unit time may prove useful. It can also be useful in open loop, autofocus systems, where different focus positions are cycled, as more focus adjustments may be made per unit time, or alternatively more attempts per unit time can be made before changing focus position.

Next, processor 290 may also include or execute one or more decoder modules 324 to decode data corresponding to each ROI into data usable by host 220. Any suitable two-dimensional decoding algorithm may be used that processes the image data to identify and possibly decode any optical codes within an ROI and reports a position (in the image coordinate system) of the detected optical code(s) within the ROI. For example, a two-dimensional decoding algorithm may be implemented by an edge detection module and may process the image data to locate edge transitions and decode the image data based on the edge transition locations. One example of an edge detection module is provided in U.S. Pat. No. 8,459,556, the entire disclosure of which is incorporated herein for all purposes.

The edge detection module may locate edge transitions in the image data by comparing a pixel value of one pixel to a pixel value of one or more adjacent pixels, starting, for example, in the upper-left corner of the acquired image and moving to the right one pixel at a time. Upon reaching the right-most pixel, the edge detection module may move down one row and continue comparing adjacent pixels moving to the left one pixel at a time. Upon reaching the left-most pixel, the edge detection module may move down another row and repeat the pixel comparisons in a serpentine like manner until reaching the lower-right corner of the acquired image (or ROI thereof). At the same time (or after the edge transition locations have been identified), one or more decoders (e.g., a low level decoder, a high level decoder, or both) may attempt to decode the image data based on the edge transition locations. After decoding an optical code, the two-dimensional decoding algorithm outputs a position within the acquired image of the decoded data (e.g., the optical code is bound by a box or rectangle having certain pixel coordinates within the image).

Many variations of two-dimensional decoding algorithms may be used. For example, the two-dimensional decoding algorithm may process the image data in other orientations, such as any combination of top-to-bottom, bottom-to-top, left-to-right, right-to-left, and diagonally or elliptically. Additionally, the two-dimensional decoding algorithm may process the image data from an image buffer or an incoming video stream. Additional details regarding two-dimensional decoding algorithms and exemplary two-dimensional decoding algorithms can be found in international standards associated with symbology types, such as ISO/IEC 16022: 2006, entitled "Information technology—Automatic identification and data capture techniques—Data Matrix bar code symbology specification," available from the International Organization for Standardization (ISO) of Geneva, Switzerland. It should be understood that the particular decoding algorithm used may vary as desired, for instance as the optical code type varies.

Signal processor 290 may further include or execute an optical code association module 326. Optical code association module 326 operates to assign an imaged optical code (and/or the decoded information from the optical code) with its corresponding object 130. The object-code association process may also include updating the object record associated with object 130 with the information encoded in the optical code. As described above, the optical code is located for an ROI that is defined when an object associated with one of the object records enters the imager's field of view. Thus, since the ROI, and therefore the optical code(s) found in the ROI, are inherently associated with one, and only one, open object record, module 326 stores the object code image or data in association with that object record.

Processor 290 may additionally include or execute other modules, such as an amplification module to amplify one or more spatial frequencies, a filtering module, a calibration module, and a timer module. The timer module may be used to indicate when to stop processing the raw data for decodable data (e.g., stop attempting to find characters). For example, to maximize throughput, the edge detection module, decoder(s) 324, or both, may stop looking for characters or other decodable data after a certain period of time or after a certain number of data frames have been captured. In other words, the timer module may prevent the edge detection and decoder modules from spending too much time trying to decode data that is not readable or decodable (or at least not easily readable or decodable) or that has already been decoded. While FIG. 4 illustrates particular modules for the sake of explanation, in other embodiments, one or more of the illustrated modules may be merged, divided into additional modules, or omitted. Following execution of the relevant modules, processor 290 may transmit the decoded information associated with a particular object 130 to host 220. The processor may also transmit the updated object record to host 220.

As noted above, in embodiments of the present invention an imager system preferably performs assignment of an optical code to its corresponding object by determining one or more ROIs within the data captured by an imager. Preferably, each ROI corresponds to a single object, and thus any optical code detected within a given ROI can be correctly assigned to the object record associated with the object on which the code is actually located. Also as noted above, the determination of a ROI may be based in part on a predetermined minimum distance between imager optics and the objects which may be imaged, although in operation, many objects which may be imaged may be at a distance from the imager optics that is greater than the minimum distance.

Where the predetermined distance between imager optics and the object is based on an assumed minimum distance, that assumption can encourage undesirable simultaneous presence of objects within an ROI and, thus, within a processed image. As the boundaries of the camera's field of view are angled with respect to vertical (i.e., in the present example of a top mounted imager, the direction extending between the imager's sensor plane and the conveyor plane), so are the ROI's boundaries. Since the ROI determination assumes the object height is at maximum, and if a given object is in fact at that maximum height, then the front and rear edges of ROI in one embodiment would simultaneously engage the front and rear edges of the object, and thus no light at the forward or aft extents of the ROI could reflect from an object other than the object of interest. But if, as will often be the case, the actual object is shorter than the maximum height, then some light at the forward and/or rear end of the ROI will reflect from the conveyor surface forward or aft of the object of interest (in the y-axis direction, as described above) or, possibly, from an object forward or aft of the object of interest. This, in turn, raises the possibility that a code detected within the image might be located on an object other than the object of interest. Since the system in this embodiment does not analyze for object boundaries, the system may not recognize that a code is not actually located on the object of interest, thereby leading to improper or incorrect object-code association.

Therefore, to ensure that a ROI does not include multiple objects, the objects to be imaged by the imager system may preferably be spaced apart in the direction of travel (e.g., in the y-axis direction described above) by a minimum gap. Although it will become apparent that a minimum required gap between any two objects will vary based on the respective heights of the objects and the viewing angle of the imager, it may be desirable to determine the minimum gap by which all objects within the system should be spaced in the direction of travel based on the predetermined maximum object height (i.e. minimum distance between imager optics and object). This is because, as noted above, each ROI may be determined based on the assumption that each passing object has a height equal to the predetermined maximum height, even though the objects may in practice be shorter.

Figure 5:
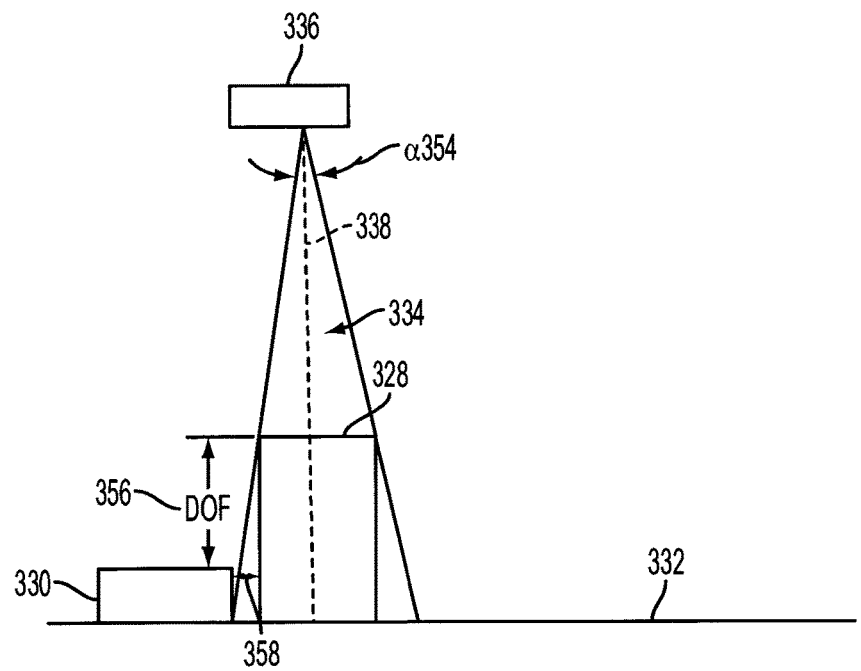
FIG. 5 is a schematic side elevation of an imager system in use with a conveyor system according to an embodiment of the present invention.
Figure 6:
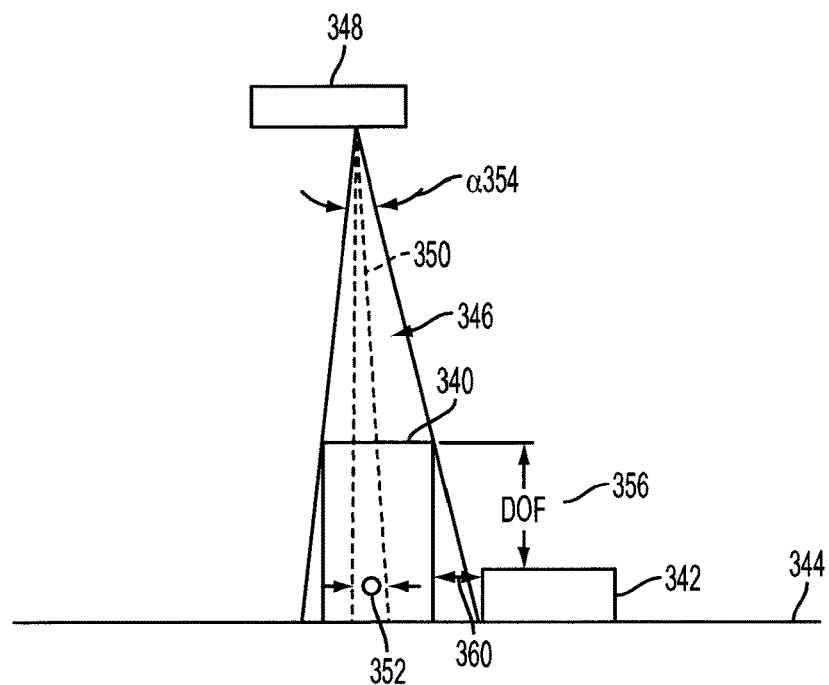
FIG. 6 is a schematic side elevation of an imager system in use with a conveyor system according to another embodiment of the present invention.

In this regard, FIGS. 5 and 6 relate to methods by which the minimum gap for a given system may be calculated according to embodiments of the present invention. FIG. 5 is a schematic side elevation of two objects 328, 330 traveling on a conveyor system 332 through a field of view 334 of an imager system 336. In FIG. 5, an optical axis 338 of imager system 336 is perpendicular to conveyor system 332. Similarly, FIG. 6 is a schematic side elevation of two objects 340, 342 traveling on a conveyor system 344 through a field of view 346 of an imager system 348. In FIG. 6, an optical axis 350 of imager system 348 is not perpendicular to conveyor system 344 (for example to avoid direct light reflection when capturing an image), but rather "skewed" from perpendicular by an angle θ, identified by reference numeral 352. Imager systems 336 and 348 are preferably analogous to imager system 100, described above.

In general, the minimum gap may be calculated by knowing α, which is identified by reference numeral 354 in FIGS. 5 and 6 and represents the imager system's viewing angle; by knowing θ, which represents the angle between the optical axis of an imager system and a line perpendicular to the conveyor system, also known as the "skew"; and by knowing DOF 356, the depth of field, which in many applications may be the difference in height between the maximum height object and the minimum height object. In some applications, the depth of field may simply be the maximum height itself. The minimum gap may then be calculated based on the following formula:

$$\text{Min} \cdot \text{Obj} \cdot \text{Gap} = DOF * \tan\left(\frac{\alpha}{2} + \theta\right)$$

For example, in FIGS. 5 and 6, α may be equal to 18.8°. Further, objects 328 and 340 may have the maximum height that any object may have in the system. Likewise, objects 330 and 342 may have the minimum height that any object may have in the system. As an example, DOF may be equal to 500 mm. Finally, in the system of FIG. 6, θ may be 5°. Accordingly, in the system shown in FIG. 5, the minimum object gap 358 would be 82.77 mm. In the system shown in FIG. 6, however, the minimum object gap 360 would be 128.38 mm because of the skew.

Moreover, as noted above, the imager's viewing angle α affects the size of the minimum gap. Those skilled in the art should appreciate that narrower viewing angles may be achieved, for example, by increasing the optical path within an imager system. Methods for achieving narrower viewing angles are described in U.S. Pat. Nos. 8,322,621 and 8,488,210, the entire disclosures of which are incorporated by reference herein in their entireties for all purposes. Continuing to use the example of a 500 mm DOF and an θ of 0°, Table 1 below illustrates that as the imager system's viewing angle decreases, so does the minimum gap.

TABLE 1

Minimum Gap Based on Viewing Angle for a System Wherein DOF is 500 mm and θ is 0°

| Lens | Viewing Angle, α | Minimum Gap |
| --- | --- | --- |
| 16 mm | 29.4° | 131.17 mm |
| 25 mm | 18.8° | 82.77 mm |
| 35 mm | 13.5° | 59.18 mm |
| 50 mm | 9.4° | 41.11 mm |

The same is true where an imager system's optical axis is skewed from perpendicular. For example, Table 2 below compares the minimum gap and the viewing angle for θ equal to 5° and 10°.

TABLE 2

Minimum Gap Based on Viewing Angle for a System Wherein DOF is 500 mm and θ is either 5° or 10°

| Lens | Skew, θ | Viewing Angle, α | Minimum Gap |
| --- | --- | --- | --- |
| 16 mm | 5° | 29.4° | 179.03 mm |
| 16 mm | 10° | 29.4° | 229.97 mm |
| 25 mm | 5° | 18.8° | 128.38 mm |
| 25 mm | 10° | 18.8° | 176.08 mm |
| 35 mm | 5° | 13.5° | 104.00 mm |
| 35 mm | 10° | 13.5° | 150.48 mm |
| 50 mm | 5° | 9.4° | 85.47 mm |
| 50 mm | 10° | 9.4° | 131.17 mm |

In practice, the gap between objects in certain transport and logistics conveyor systems is approximately 100 mm (although such applications may specify a gap of approximately 50 mm, for example) regardless, and therefore would meet the minimum gap criteria discussed above. Thus, it will be appreciated that embodiments of the present invention may be readily adapted for such applications, among others.

In some embodiments, the minimum gap calculation described above may be determined by imager system 100, for example via processor 150. A user of system 100 may input the known values of DOF, θ, and α, for example using input controller 190. Of course, the user could also determine the minimum gap by hand, assuming the values of DOF, θ, and α are known. In any event, after the minimum gap is determined for a given system, the user may ensure that objects 130 being conveyed on conveyor system 140 are spaced by at least the determined minimum gap.

Shorter minimum gaps can be achieved through a regionalization of the image, i.e. by defining, as part of the system's set up, an initial region of interest with respect to the total sensor size, i.e. boundaries of the larger image area, effected either mechanically or through software, that are within the larger area, in this instance with regard to the y direction. In the context of the ROI identification procedure discussed below, this means that the ROI is determined through the methods described below, but that in the event the determined ROI has a y length greater than the initial windowing length in the y direction, then the ROI y dimension is set to the smaller dimension. By effectively reducing the sensor size, this effectively reduces the angle α. The sensor framing is primarily operated along the conveyor direction (i.e. the y direction) in order to support proper object gaps, and the reduced scanning coverage can be compensated through multiple acquisitions, which are expected to be faster thanks to the sensor framing. The reduced camera/reader coverage would lead to a smaller size of the object that can be framed but would allow smaller gaps and faster processing without reducing lateral (i.e. in x direction, in these examples) resolution. This approach can allow use of a sensor such that has an effective sensor size that may not available for commercially available sensors operated in their full range. For example, a 1280×1024 pixel sensor could be used at a full 1280 pixel resolution along the conveyor width, but with a ROI of 1280×614, the processing speed of a 1024×768 sensor could be achieved without reducing accuracy in the x direction, while allowing shorter gaps in the y direction.

Figure 7:
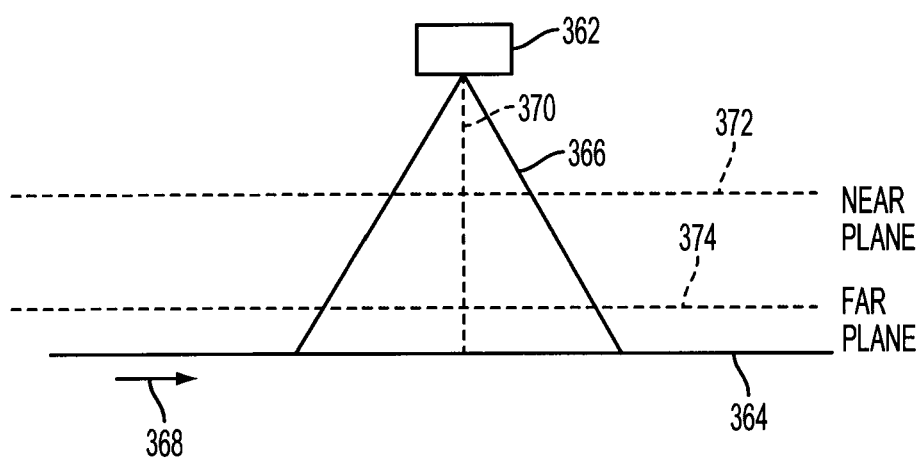
FIG. 7 is a schematic side elevation of an imager system configured for use with a conveyor system according to a further embodiment of the present invention.

A description of a method for determining a ROI within a captured image according to embodiments of the present invention is described below with reference to FIGS. 7-11. In particular, FIG. 7 is a schematic side elevation of an imager system 362 configured for use with a conveyor system 364. Preferably, imager system 362 and conveyor system 364 are analogous to imager system 100 and conveyor system 140, described above. The imager system may have a field of view 366, through which objects pass as they are conveyed in the direction of travel 368 by conveyor system 364. As shown in FIG. 7, an optical axis 370 of imager system 362 is perpendicular to conveyor system 364 (i.e. vertical) in this embodiment.

Within the frame of reference of imager system 362 there are preferably defined a near plane 372 and a far plane 374. Near plane 372 is preferably located above conveyor system 364 at a height equal to the maximum height object that may be imaged by imager system 362. Similarly, far plane 374 is preferably located above conveyor system 364 at a height equal to the minimum height object (or, object at maximum distance from the optics) that may be imaged by imager system 362. This height may be defined by the system operator, depending on the particular types of objects the operator wishes to convey on the conveyor, and their maximum height. This data, in turn, may be stored in memory of system 100 as part of the calibration process. Regardless, the locations of the near and far planes 372, 374 may vary depending on the height of the maximum and minimum height objects. Further, in some cases, a minimum height object may not be specified, in which case far plane 374 may be coincident with the surface of conveyor system 364 (in the case of a side mounted imager, if no minimum height/maximum distance is specified, the maximum distance default's to a distance equal to the distance from the imager optics to the far edge of the conveyor surface). Because imager system 362 knows the distance between itself and the surface of conveyor system 364, and because it also knows the maximum and minimum heights, imager system 362 knows the distance between itself and the near and far planes 372, 374. Based also on other known optical parameters, for example such as the imager system 362's view angle and magnification, imager system 362 can determine the number of pixels per inch (PPI) or pixel per mm (PPM) in each of the near and far planes 372, 374.

In one embodiment, the optics of imager system 362 focus the imager on the far plane, or close to it. This is generally because it is desirable to have the best focus where there is the lowest intrinsic resolution; otherwise said, codes of same size appear smaller when imaged at the far plane (fewer pixels-per-element), and so the sharper image is needed when the image has the lowest pixel-per-element. This may put the near plane image somewhat out of focus, but pixel-per-element is greater at the near plane, and defocus is more easily addressed in an image with the higher ratio. This is primarily true of systems with fixed focusing capability, but can also apply to systems with autofocusing characteristics.

As discussed below, the ROI may be determined, in part, based on an object's position within the frame of reference, or coordinate system, of imager system 362. However, the ROI itself may be a region in the frame of reference of a captured image, which imager system 362 processes to locate and read an optical code. Imager system 362 may then perform a process to assign the optical code to its corresponding object. In one embodiment, imager system 362 must know the relationship between the image frame of reference and the imager system's frame of reference in order to transform the position of the optical code within a ROI in an image to a position in imager system 362's frame of reference. As discussed in more detail below, the imager's frame of reference is translated to the absolute (conveyor) frame of reference.

Accordingly, it may be necessary to perform a calibration procedure with imager system 362 prior to operation. One calibration procedure used to determine the relationship between an image frame of reference and the frame of reference of imager system 362 is described below with respect to FIGS. 8 and 9. Notably, this calibration procedure may preferably determine the relationships between the image frame of reference and both near plane 372 and far plane 374 (in the imager system's frame of reference). The calibration procedure may be performed by a processor of imager system 362, such as processor 290 described above, executing a calibration module.

Figure 8:
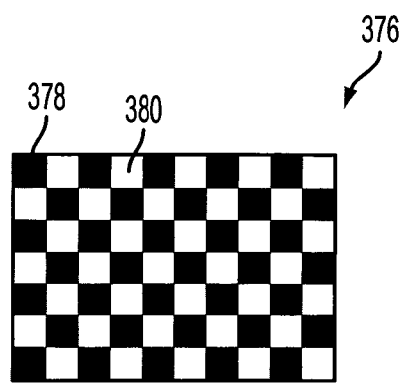
FIG. 8 is a plan view of a calibration pattern according to an embodiment of the present invention.

In this regard, FIG. 8 is a plan view of a calibration pattern 376 according to an embodiment of the present invention. As shown, calibration pattern 376 may be substantially rectangular in shape and may comprise a plurality of rows of alternating black 378 and white 380 squares, resembling a checkerboard pattern. In other embodiments, however, calibration pattern 376 need not be rectangular or comprise alternating squares. Those of skill in the art are familiar with other suitable calibration patterns for this purpose.

To perform the calibration procedure, a user may first position calibration pattern 376 within near plane 372, for example by placing calibration pattern 376 on a top surface of a maximum height object. The object may be positioned beneath imager system 362. Next, the user may center calibration pattern 376 in field of view 366 of imager system 362, for example by examining an image captured by imager system 362 or a preview thereof. Preferably, calibration pattern 376 may be sized so that it fills the entire field of view 366. Imager system 362 preferably knows the dimensions of pattern 376 within its frame of reference, for example based on user input, and as noted above it also knows the distance between itself and near plane 372. The user may then calibrate imager system 362 for near plane 372 by entering the coordinates (in the imager system 362 frame of reference) of a specific point on pattern 376.

From this information, imager system 362 may compute a geometric transformation which may be used to transform pixel values in an image to positions within the imager system 362 frame of reference, in particular within near plane 372. Those of ordinary skill in the art are familiar with suitable geometric transformation techniques, which for example are known in the field of computer vision to assess the position and inclination of a camera. In one embodiment, imager system 362 may calculate a planar homography, which may take the form of a 3 by 3 transformation matrix, which may be used to perform the transformation. To transform a point in pixel (image) coordinates $$\begin{bmatrix} u \\ v \end{bmatrix}$$

into a point in absolute (conveyor) coordinates $$\begin{bmatrix} x \\ y \end{bmatrix},$$

the general form of a homographic transform may be used in some embodiments:

$$\begin{bmatrix} x' \\ y' \\ w \end{bmatrix} = \begin{bmatrix} h_{11} & h_{12} & h_{13} \\ h_{21} & h_{22} & h_{23} \\ h_{31} & h_{32} & h_{33} \end{bmatrix} \cdot \begin{bmatrix} u \\ v \\ 1 \end{bmatrix}$$

$$\begin{bmatrix} x \\ y \end{bmatrix} = \begin{bmatrix} \frac{x'}{w} \\ \frac{y'}{w} \end{bmatrix}$$

Coefficients of the matrix are determined during calibration.

The user may then repeat this process for far plane 374. For example, the user may position a calibration pattern 376 sized to fill the entire field of view 366 on a top surface of a minimum height object. The user may position the object beneath imager system 362 and center pattern 376 within field of view 366. Again, imager system 362 preferably knows the dimensions of this pattern 376 within its frame of reference, for example based on user input. The user may then calibrate imager system 362 for far plane 374 by entering the coordinates (in the imager system 362 frame of reference) of a specific point on pattern 376. From this information, imager system 362 may compute a second geometric transformation which may be used to transform pixel values in an image to positions within the imager system 362 frame of reference, in particular within far plane 374. If a minimum height object is not specified, the user could perform this procedure with a calibration pattern 376 on the surface of conveyor system 364.

Figure 9:
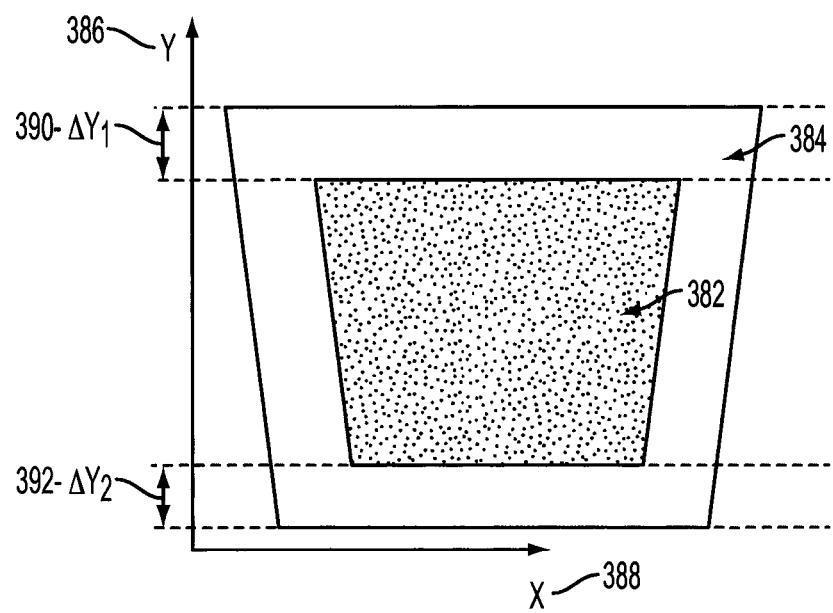
FIG. 9 is a schematic representation of the area of an image captured by an imager that has been transformed to the near and far planes in the imager's frame of reference.

Notably, this calibration procedure may also be used as an alternative method for determining the minimum gap by which objects to be imaged should be spaced. This may be desirable, for example, where a user does not know or cannot determine with necessary accuracy the values of DOE, $\theta$, and/or $\alpha$. In this regard, FIG. 9 is a schematic representation of the areas 382, 384 of an image captured by imager system 362 that has been transformed to near plane 372 and far plane 374, respectively, in the frame of reference of imager system 362. A y-axis 386 in FIG. 9 preferably extends parallel to y-axis 316, and an x-axis 388 preferably extends parallel to x-axis 314, described above. (For the description of this figure, it is noted that the optical axis of imager system 362 is somewhat skewed from perpendicular, resulting in the trapezoidal shape of areas 382, 384.)

More particularly, following the calibration procedure described above, imager system 362 may acquire an image. Imager system 362 may then apply the geometric transformation for near plane 372 to at least the corners of the image, yielding the area 382 in FIG. 9. In other words, the resulting shape of area 382 is the quadrilateral which delimits field of view 366 in near plane 372. Likewise, area 384 results from imager system 362 applying the geometric transformation for far plane 374 to at least the corners of the image. Again, the resulting shape of area 384 is the quadrilateral which delimits field of view 366 in far plane 374.

Area 382 will be smaller than area 384 in the x-axis 388 and y-axis 386 directions. Notably, area 382 is shorter than area 384 in the y-axis 386 direction by the amount of $\Delta Y_1$, identified by reference numeral 390, plus $\Delta Y_2$, identified by reference numeral 392. To determine the minimum gap, imager system 362 may compare $\Delta Y_1$ and $\Delta Y_2$. Imager system 362 may then determine that the larger of these two values should be the minimum object gap. It will be appreciated that this procedure may be performed for any skew angle of the optical axis of imager system 362. Where the optical axis is not skewed, $\Delta Y_1$ and $\Delta Y_2$ will be equal. These values are equal to the minimum gap because shape 384 represents the field of view footprint, whereas 382 represents the field of view at the near field, and thus the two distances between those two shapes, in the vertical direction in the figure, represent the gaps needed in the front and rear (in the conveyor's travel direction).

Figure 10:
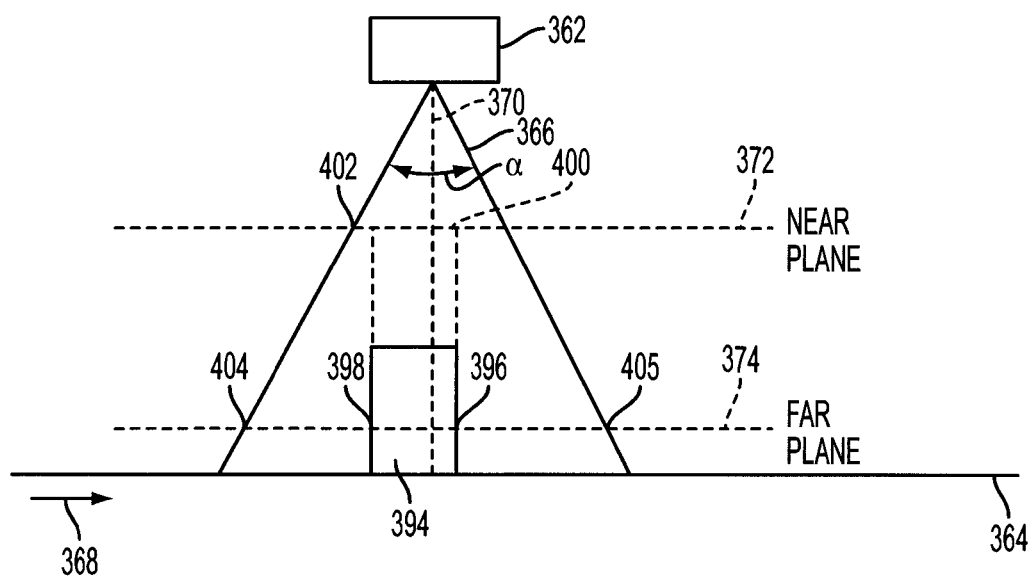
FIGS. 10, 10A, 10B, and 10C are schematic elevations of objects within the field of view of the imager system of FIG. 7 according to an embodiment of the present invention.

Turning now to FIG. 10, an object 394 is shown within field of view 366 of imager system 362. As shown, object 394 is taller than a minimum height object but shorter than a maximum height object. Imager system 362 preferably knows the positions Plead and Ptrail, in linear units (e.g., inches or millimeters) in the conveyor frame of reference, of the leading edge 396 and the trailing edge 398 of object 394 along the direction of travel. As described above, the system updates these values each time it acquires an image.

However, to determine the ROI for object 394 for use in selectively activating sensor pixels or for selecting image pixels from a larger image captured by imager system 362, imager system 362 may assume that object 394 is in fact equal in height to a maximum height object. Thus, imager system 362 may determine the ROI for object 394 based not on its actual dimensions, but rather on the dimensions of a simulated object 400. Simulated object 400 preferably has a footprint (e.g., length and width dimensions) identical to that of object 394 but has a height equal to that of a maximum height object, as shown by the dashed line in FIG. 10. Thus, leading and trailing edges 396, 398 of object 394 are also the leading and trailing edges of simulated object 400. In one preferred embodiment, the ROI for object 394 corresponds only to object 394, meaning that the ROI contains at least a portion of object 394 but does not contain another object within field of view 366. In an alternate embodiment, a light curtain upstream from the imager measured the actual height of object 394 and outputs the actual height data to imager system 362, so that imager system 362 uses the object's actual height (i.e. the actual distance between the imager optics and the object) to dynamically define the ROI.

In addition, to determine the ROI for object 394, imager system 362 may also know the positions, in linear units in the imager system 362 frame of reference, of the edges 402, 404 of field of view 366 in near plane 372 and far plane 374, respectively. Edge 402 is the position in the direction of travel (e.g., parallel to y-axis 316) which corresponds to the zeroth sensor pixel corresponding to near plane 372 in an image captured by imager system 362. Similarly, edge 404 is the position in the direction of travel which corresponds to the zeroth sensor pixel corresponding to far plane 374 in the image. The values of edge 402, 404 are preferably known to imager system 362 based on the calibration process described above. Point 402 is referenced below as PoffsetNear, whereas point 404 is referenced as PoffsetFar. Edge 405 is the position in the direction of travel that corresponds to the last pixel of far plane 374 in the image, and is referenced as Noffsetfar.

The ROI for object 394 is preferably defined in terms of a maximum pixel value (PIXmax) and a minimum pixel value (PIXmin) in the direction of travel within an acquired or to be acquired image. That is, the ROI is a set of sensor pixels bounded in the y direction based on the distance between the imager optics and the object. The maximum pixel value represents the downstream boundary of the ROI in the y-axis 316 direction. The minimum pixel value represents the upstream boundary of the ROI in the y-axis 316 direction. Typically, the ROI may be a subsection of the entire length of field of view 366 in the y-axis 316 direction. Preferably, in a two-dimensional image, the boundary of the ROI extends the entire length of field of view 366 in the x-axis 314 direction, though this is not required in all embodiments. Thus, for example, the ROI may take the form of a rectilinear subsection of an acquired image which may vary in location and length in the y-axis 316 direction but may be fixed in length in the x-axis 314 direction (although it should be understood that the system may be configured so that the ROI is variable, and can be bounded, in both the y and x directions).

In general, and referring by way of example to FIG. 10, the process by which the imager acquires an object code from an image, in certain embodiments as described herein, can be described as follows:

Step 1: Provide an imager in a predetermined orientation with respect to the conveyor surface. In this example, the imager is assumed to be above the conveyor, but it should be understood that other orientations, for instance side mounts, may be employed.

Step 2: Assume a field of view extending from a point at the imager and extending therefrom (in the z direction) above and toward the conveyor or, for a side mounted camera, above the conveyor in a direction parallel to the conveyor surface. Considered in cross section in the y-z plane, the top-mounted imager's lens aperture defines an angular width $\alpha$ for the field of view. This angle may be considered in the x-y plane for a side mounted camera.

Step 3: Based on the Nlead and Ntrail values of all open object records, and time elapsed (as determined by comparison of current tachometer value to the Nlead+pulses to FOV and Ntrail+pulses to FOV values or a comparison of time stamps), determine whether any object corresponding to an object record is likely within the imager's field of view. If not, end.

Step 4: If, at Step 3, an object is likely within the imager's field of view, acquire tachometer value (or time stamp) and update Plead and Ptrail for all open object records or at least for those record(s) corresponding to objects likely in the field of view.

Step 5: For each object record for which an object is within the field of view at Step 3, in one embodiment determine that portion of the angular width of the field of view that could possibly encompass the object. Assuming both the minimum height and the maximum height, find the leadingmost angle and the trailingmost angle. This results in four angles (measured with respect to the imager's optical axis), one each for (a) trailing edge, assuming lowest height, (b) trailing edge, assuming highest height, (c) leading edge, assuming lowest height, and (d) leading edge, assuming highest height. In an embodiment in which a light curtain feeds actual height data, only analyses (b) and (d) are needed, with respect to the actual height value. One of the two trailing edges will define the trailingmost angle, the deciding factor being on which side (in the y direction) of a line from the vertex of the imager's field of view to the conveyor surface (for a top mounted imager) or a plane perpendicular to the conveyor surface (for a side mounted imager) the object's trailing edge (hereinafter the "vertex line") is located. If the object's trailing edge is before (in the y direction) the imager vertex line, then the angle enclosing the trailing edge, assuming highest height, is the trailingmost angle. If the trailing side is forward of the vertex line, the situation is reverse. For the leading edges, if the object's leading edge is before the imager's vertex line, then the leading edge, assuming the minimum height, is the leadingmost angle, whereas the leading edge, assuming maximum height, is the leadingmost angle when the object's leading edge is aft of the vertex line. In the embodiment in which the actual height is used, the minimum and maximum filters are not needed, because there is only one angle for the leading edge and one angle for the trailing edge. These two angles, therefore, define the ROI for such embodiments.

Step 6: Determine the image pixels that embody that part of the image corresponding to the now-defined ROI. Determine if the calculated ROI extends outside the imager field of view, i.e. if the ROI starts at a negative pixel number or ends at a pixel number higher than the sensor size, and in that case reduce the ROI so that it is entirely within the field of view (i.e. so that it does not extend beyond the edges of the field of view).

Step 7: Retrieve image data corresponding to those pixels identified at Step 6, either by restricting activation of the image sensor elements only to activation of those elements that, when active, produce image data within the ROI or by retrieving from the sensor data from all elements and excluding pixels outside the ROI from the analysis, and search for the presence of optical codes in the ROI image data, excluding image data outside the ROI.

Imager system 362 may determine the minimum and maximum pixel values in accordance with the method explained herein, in conjunction with the following formulas. As noted above, PIXmax and PIXmin are the pixel count (i.e. sensor pixels, or pixels corresponding to an acquired image) along the y direction that identify the boundaries (in the y direction) of the ROI. PIXtotVert is the total number of sensor pixels along the selected sensor direction (i.e. the y direction, in this example), or conveyor direction (for a 1024×768 sensor aligned with its shorter side along y direction, PIXtotVert=768), i.e. the sensor size in the direction of travel y. $\alpha$ is the aperture lens angle for the camera along the object motion direction y (in the y-z plane, as noted above). $\theta$ is the imager skew angle, with respect to the line extending from the vertex of the imager's field of view and perpendicular to the conveyor plane (if a top-mounted imager) or to a plane perpendicular to the conveyor plane (if a side mounted imager). The skew angle is positive along the motion direction.

In general, the relationships below are described in terms of linear distance, for example in terms of units of measure such as inches or mm. In other words, the equations initially determine the ROI in terms of such units of measure. Because the image is defined in terms of pixels, however, the method converts such distance to pixels, and thus needs a conversion factor. Consider a two dimensional sensor array, as described herein, that acquires images of a conveyor that conveys objects having hexahedron (including cuboid) shapes. Assume that the imager is arranged so that the optical axis of the imager's optics/sensor arrangement is generally perpendicular to the expected plane of the surfaces of the hexahedron objects (e.g. boxes) on which the optical codes (which the imager is intended to read) are expected to be disposed (for side mounted imagers, it is expected that box sides will often not be exactly perpendicular to the imager optical axis, but as a practical matter, the system can read optical codes on box surfaces that are offset from perpendicular). The equations below initially determine the length, in the direction(s) in which the ROI can vary (in this example, the direction of the conveyor's movement, or y direction), of the generally planar object surface in the expected perpendicular (with respect to the imager optical axis) plane. That length appears in the acquired image, and will cover some number of pixels in the image, in the y direction. Thus, the conversion from length to pixels (e.g. pixels per inch (PPI) or pixels per millimeter (PPM)) in the particular perpendicular plane in which the length occurs may be described as PPM (assuming mm)=the total number of pixels in the sensor in the y direction (PIXtotVert), divided by the length (in mm) in the y direction of the perpendicular plane as it appears in the image. As noted above, the imager's field of view is not columnar, but rather expands at an angle with respect to the imager's optical axis. Thus, the ratio of sensor pixels to perpendicular plane length decreases with distance from the imager. Where skew angle ($\theta$) is zero, the pixel per distance (assume mm) can be described as:

$$PPM = \frac{PIXtotVert}{2H\tan(\alpha/2)}$$

where H is the distance between the imager and the plane of the object surface. As will be understood in view of the present disclosure, this relationship changes in the presence of skew angle, but in practice, variation with skew is minimal and can be ignored. Thus, the presently described embodiments ignore skew, although it should be understood that accommodation for skew falls within the disclosure.

Figure 10A:
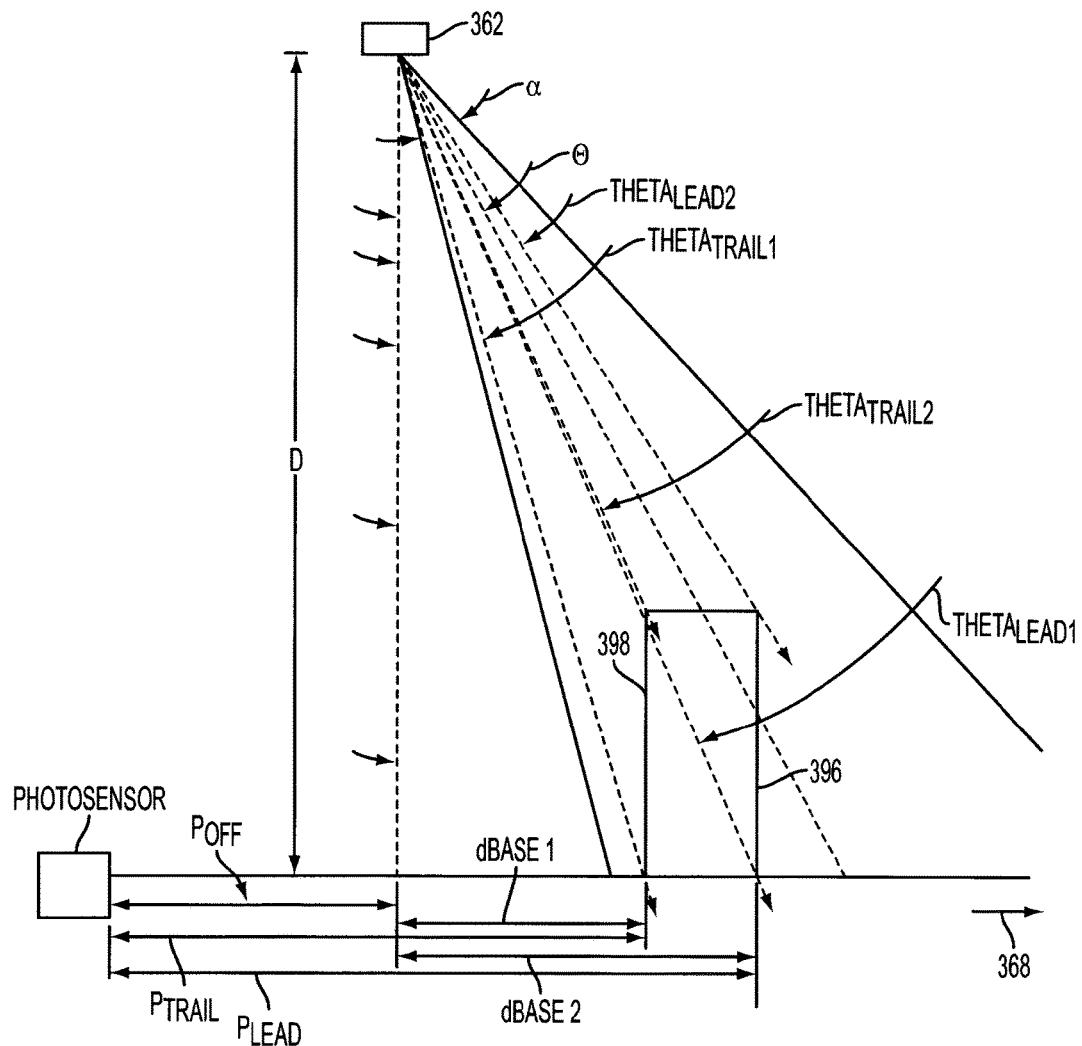

As noted, the present algorithm determines the length of the box surface, in this instance in the y direction, for the given position of the box in the acquired image (where the box's position is identified by Plead and Ptrail). As described above, the distance in the y direction (described as "linear" distance (e.g. in inches or mm), although this should be understood to refer to the y direction, even if the y direction curves with the conveyor upstream from the imager) between the known reference point (e.g. the photosensor) and the box leading edge is Plead, and between the known reference and the box trailing edge is Ptrail. Also as discussed above, the linear distance between the reference point (generally located at the photosensor) and the intersection of the imager's vertex line with the conveyor plane is also known and stored in the imager system memory (Poff). Therefore, the distances from (a) the intersection of the vertex line and the conveyor plane to (b) the box leading (dbase2) and trailing (dbase1) edges are, respectively:

$d\text{base2}=P\text{lead}-P\text{off}$ $d\text{base1}=P\text{trail}-P\text{off}$ Poff may also be described as the distance between the photosensor and the orthogonal projection of the reader FOV origin on the conveyor plane. Dbase1 and dbase2 are illustrated in FIG. 10A.

The imager processor then determines the angle, with respect to the imager optical axis, to the top corners of the leading and trailing edges of the box. As noted, the box height may be unknown, and in such embodiments the processor determines the two angles under each of two assumptions, i.e. that the box has the maximum height of boxes carried by the conveyor, and that the box has the minimum height of boxes carried by the conveyor, thereby resulting in four angles: Theta$_{trail1}$ (angle between vertex line and line from imager to box trailing edge, at minimum height), Theta$_{trail2}$ (angle between vertex line and line from imager to box trailing edge, at maximum height), Theta$_{lead1}$ angle between vertex line and line from imager to box leading edge, at minimum height), and Theta$_{lead2}$ (angle between vertex line and line from imager to box leading edge, at maximum height). FIG. 10A illustrates the four angles. While the example in FIG. 10A illustrates that the box minimum height is zero, it should be understood that a non-zero height can be used. Also, as noted above, where an upstream light curtain provides actual height data, only two angles, Theta$_{lead2}$ and Theta$_{trail2}$, need be determined.

The two trailing angles can be determined as follows, where DOF is the difference between the maximum and minimum object height:

$$Theta_{trail1} = \arctan\left(\frac{dbase1}{D}\right)$$

$$Theta_{trail2} = \arctan\left(\frac{dbase1}{D-DOF}\right)$$

The imager processor selects the smaller (when considered either as a positive angle (i.e. when forward of the optical axis, in the y direction) or as a negative angle (i.e. when rearward of the optical axis, in the y direction) of these two angles as the angle (Theta$_{trail}$) that encompasses the trailing edge of the ROI:

Theta$_{trail}$=min(Theta$_{trail1}$;Theta$_{trail2}$)

Where the box trailing edge is forward of the optical axis (in the y direction), the minimum angle will be Theta$_{trail1}$. Where the box trailing edge is rearward of the optical axis (in the y direction), the minimum angle will be Theta$_{trail2}$. Put another way, the imager selects the angle that defines the wider cone for the ROI, to thereby assure that the ROI will encompass the box, regardless of its actual height within the range from the predetermined minimum height to the predetermined maximum height.

The processor follows a similar procedure to determine the front of the ROI. The two leading angles can be determined as follows:

$$Theta_{lead1} = \arctan\left(\frac{dbase2}{D}\right)$$

$$Theta_{lead2} = \arctan\left(\frac{dbase2}{D-DOF}\right)$$

The imager processor selects the larger (when considered either as a positive angle (i.e. when forward of the optical axis, in the y direction) or as a negative angle (i.e. when rearward of the optical axis, in the y direction) of these two angles as the angle (Theta$_{lead}$) that encompasses the leading edge of the ROI:

Theta$_{trail}$=max(Theta$_{lead1}$;Theta$_{lead2}$)

Where the box leading edge is forward of the optical axis (in the y direction), the maximum angle will be Theta$_{lead2}$. Where the box leading edge is rearward of the optical axis (in the y direction), the maximum angle will be Theta$_{lead1}$. Again, the imager selects the angle that defines the wider cone for the ROI, to thereby assure that the ROI will encompass the box, regardless of its actual height within the range from the predetermined minimum height to the predetermined maximum height. Again, where an upstream light curtain provides actual height data, there is only one lead angle and only one trail angle, thereby defining the ROI and obviating the need to make the minimum and maximum comparisons.

It is possible that the cone defined by $\text{Theta}_{trail}$ and $\text{Theta}_{lead}$ extends outside the field of view (i.e. outside the cone defined in the y-z plane by α. In that event, the ROI extends beyond the image captured by the sensor pixels. Thus, in that event, the imager processor reduces (if the angle is positive) or increases (if the angle is negative) Pixmax or Pixmin, based on $\text{Theta}_{trail}$ and/or $\text{Theta}_{lead}$, depending which or both of the angles extends outside the field of view, so that the ROI cone is at or within the boundaries of the field of view.

The imager processor now converts the boundary angles to sensor pixel values. As noted above, PIXtotVert is the number of sensor pixels in the y direction. If each sensor pixel in the line of sensor pixels in the y direction is assigned a pixel number, beginning with zero and increasing to the total PIXtotVert value in the y direction, then the pixel at the center (i.e. at the optical axis) is PIXtotVert/2. H tan($\text{Theta}_{trail}$) is the projection of the $\text{Theta}_{trail}$ angle onto the y direction at some distance H (in linear distance, such as inches or mm), and as noted above, the ratio PPM converts such a linear distance to sensor pixel values. Note that Htan($\text{Theta}_{trail}$) is positive if the trailing edge is forward of the vertex line and negative if rearward of the vertex line. Thus, the sensor pixel value corresponding to the ROI trailing edge is:

PIXmin=PIXtotVert/2+$H$ tan($\text{Theta}_{trail}$)×PPM

Since $$PPM = \frac{PIXtotVert}{2H\tan(\alpha/2)}$$

the "H" (i.e. height) terms cancel, and $$PIX\min = PIXtotVert/2 + \tan(Theta_{trail}) \times \frac{PIXtotVert}{\tan(\alpha/2) \times 2}$$

Accordingly, PIXmin is the PIXmin$^{th}$ sensor, measured in the y direction from the beginning of the sensor pixels (measured in the y direction), at which the ROI begins.

The leading edge of the ROI is determined in a similar manner, except depending on $\text{Theta}_{lead}$:

$$PIX\max = PIXtotVert/2 + \tan(Theta_{lead}) \times \frac{PIXtotVert}{\tan(\alpha/2) \times 2}$$

The equations above assume skew is zero. However, the introduction of skew simply shifts the ROI angles by the skew amount. Although the imager's optical axis shifts by skew angle θ, the angles and distances described above continue to be measured from the perpendicular line that the imager's optical axis defines when skew angle is zero (vertex line, i.e. the line from the imager's vertex of field of view and the conveyor plane, if a top-mounted imager, or from the field of view vertex and a plane perpendicular to the conveyor plane, if a side-mounted imager). Another description of this line is the line between the imager optics and the point in the image plane corresponding to PIXtotVert/2. The effect of the skew angle, and the angles and distances discussed above, are illustrated at FIG. 10A. Thus, the skew angle has the effect of modifying the PIXmin and PIXmax equations (as determined by the imager processor) as follows:

$$PIX\min = PIXtotVert/2 + \tan(Theta_{trail} - \theta) \times \frac{PIXtotVert}{\tan(\alpha/2) \times 2}$$

$$PIX\max = PIXtotVert/2 + \tan(Theta_{lead} - \theta) \times \frac{PIXtotVert}{\tan(\alpha/2) \times 2}$$

The assumption of the maximum object height is implicit in the fact that Thetalead/Thetatrail are respectively chosen as max/min. The length PIXmax−PIXmin may, therefore, be considered the projection of the image plane in the ROI (defined, in this example by a restriction in the y direction, although it should be understood there could also be a restriction in the x direction) onto the sensor pixel array.

With reference to FIG. 10, $P_{lead}$ is the position of leading edge 396, and $P_{trail}$ is the position of trailing edge 398. θ is the skew angle, but is zero in FIG. 10. As discussed above, the second term in each of the PIXmin and PIXmax expressions is used to convert the position of the ROI in the frame of reference of imager system 362 to the frame of reference of the image, and thus yield a result in units of pixels. Generally, then, this formula yields, for each image captured, the maximum value in pixels which will define the ROI boundary in the y-axis 316 direction for simulated object 400. Where an image sensor has 1024 pixels in the y-axis 316 direction, for example, 1024 will be the largest value this formula yields, as long as the maximum height object leading edge is still within the field of view edge, otherwise the processor will reduce PixMax or increase PixMin so that the ROI is within the field of view.

The term MIN means that the formula yields the result that is smallest from the two expressions set off by the bracket. Again, the second term in each expression is used to convert the position of the ROI in the frame of reference of imager system 362 to the frame of reference of the image, and thus yield a result in units of pixels. Generally, then, this formula yields, for each image captured, the minimum value in pixels which will define the ROI boundary in the y-axis 316 direction for simulated object 400. This formula will initially have a value of 0 pixels, for example as object 400 enters field of view 366.

As should be clear from the discussion above, the ROI can be considered to be determined under the assumption that the box is at the maximum height. If the box is shorter than the maximum height, then the ROI portion of the image will include some image subject matter beyond the object. As discussed above, however, the system's operation assumes that objects on the conveyor are singulated and are separated by at least the minimum gap amount. Accordingly, even though object height is unknown in some embodiments, and can vary between (including exactly at) the minimum and maximum heights, the ROI will both include the intended object but not include other objects. Thus, although the ROI can include pixels that are beyond the image of the subject object, the confidence that no other object is in the ROI eliminates the need to perform edge detection routines to identify the object's position within the ROI image.

This concludes Step 5, described above. Having determined the ROI, the imager processor then acquires the ROI image (either through selective actuation of sensor elements or selection of data pixels from a larger two-dimensional image data from the sensor) and executes a routine to identify the optical code within the ROI image, excluding consideration of the portions of the image outside the ROI. As discussed above, the particular methodologies for identifying the optical code should be well understood, and can be selected as desired, and are therefore not discussed in further detail herein.

Figure 10B:
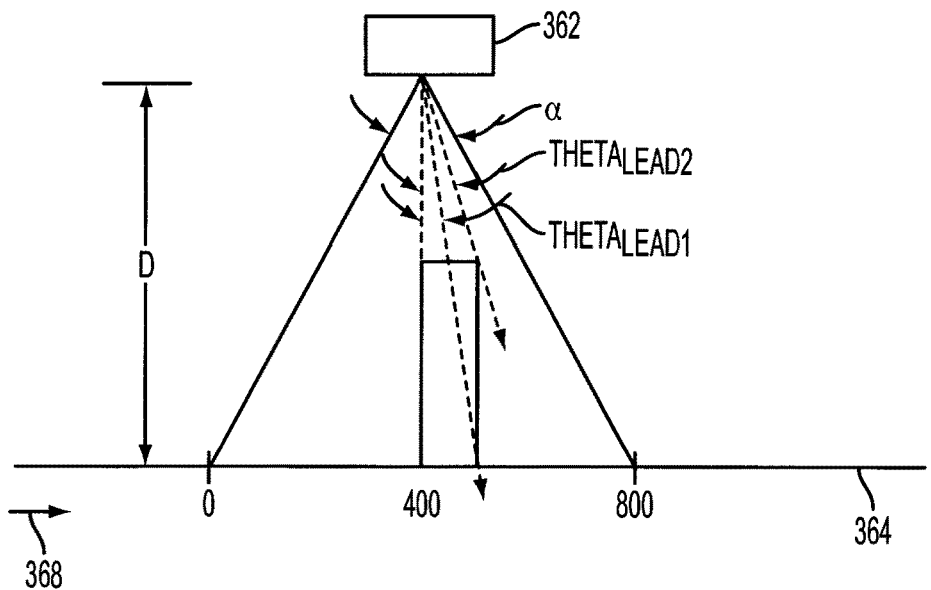
Figure 10C:
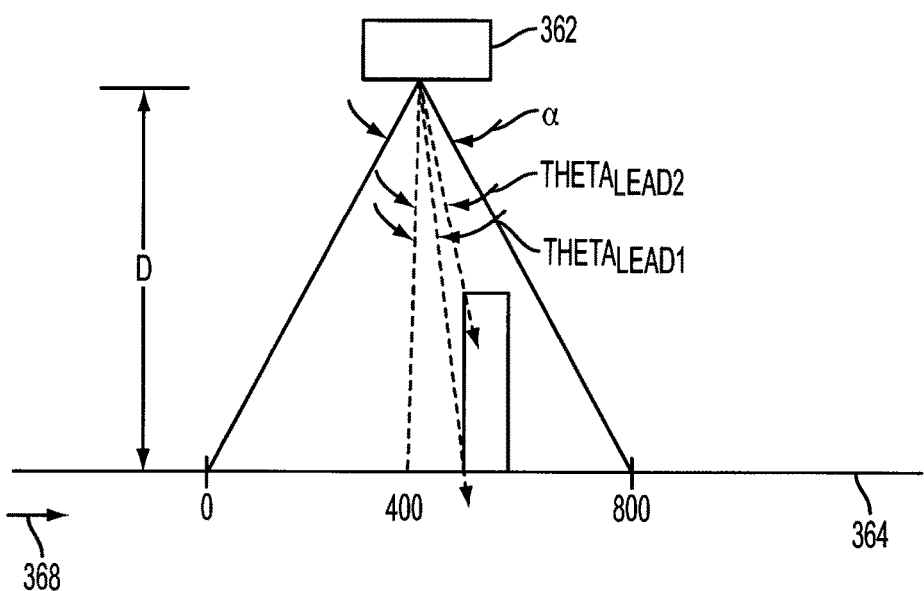

Examples of ROI calculations are provided, with respect to FIGS. 10B and 10C. Referring first to FIG. 10B, the box height is shown as the maximum height. The actual height is unknown, but is between (which could be including) the minimum and maximum heights. The box length (in the y direction) is the actual box length, and determined by the photosensor. Assume PIXtotVert=800, θ=0°, α=30°, D=1100 mm, maximum height=600 mm, minimum height=0 mm, depth of field (which equals max height minus min height)=600 mm, Poff=1000 mm, Ptrail=1000 mm, and Plead=1060.24 mm. Under these conditions, PPM=2.49 in the case of maximum distance, dbase1=0 mm, and dbase2=60.24 mm. $Theta_{trail1}$=0°, $Theta_{trail2}$=0°, $Theta_{lead1}$=3.14°, and $Theta_{lead2}$=6.87°. Accordingly, $Theta_{trail}$ is 0°, and $Theta_{lead}$ is 6.87°. PIXmin is, therefore, 400, and PIXmax is 580.

Referring to FIG. 10C, the box has moved in the y direction. Assume PIXtotVert=800, θ=0°, α=30°, D=1100 mm, maximum height=600 mm, minimum height=0 mm, depth of field (which equals max height minus min height)=600 mm, Poff=1000 mm, Ptrail=1040.16 mm, and Plead=1100.40 mm. Under these conditions, dbase1=40.16 mm, and dbase2=100.40 mm. $Theta_{trail1}$=2.09°, $Theta_{trail2}$=4.59°, $Theta_{lead1}$=5.22°, and $Theta_{lead2}$=11.35°. Accordingly, $Theta_{trail}$ is 2.09°, and $Theta_{lead}$ is 11.35°. Note that if $Theta_{lead}$ had been outside the field of view (in this example, meaning that it is greater than θ/2), $Theta_{lead}$ could be changed to 15°, or the resulting PixMax is reduced (or PIXMin increased, as appropriate) so that the ROI pixels coincide with the field of view. PIXmin is, therefore, 455, and PIXmax is 700.

Still referring to FIG. 10, it will be appreciated that as object 400 is just entering field of view 366, the ROI will have a shorter length along y-axis 316. As object 400 continues into field of view 366, the ROI will grow in length in accordance with the formulas described above. The smaller initial ROIs may be processed even more quickly than a ROI corresponding to object 400 when it is fully within field of view 366. If necessary, this may also allow the focus of imager system 362 to be adjusted more quickly, if autofocus is used. As noted above, the system may be operated with a fixed focus at a predetermined depth, for example corresponding to the minimum box height.

Figure 11:
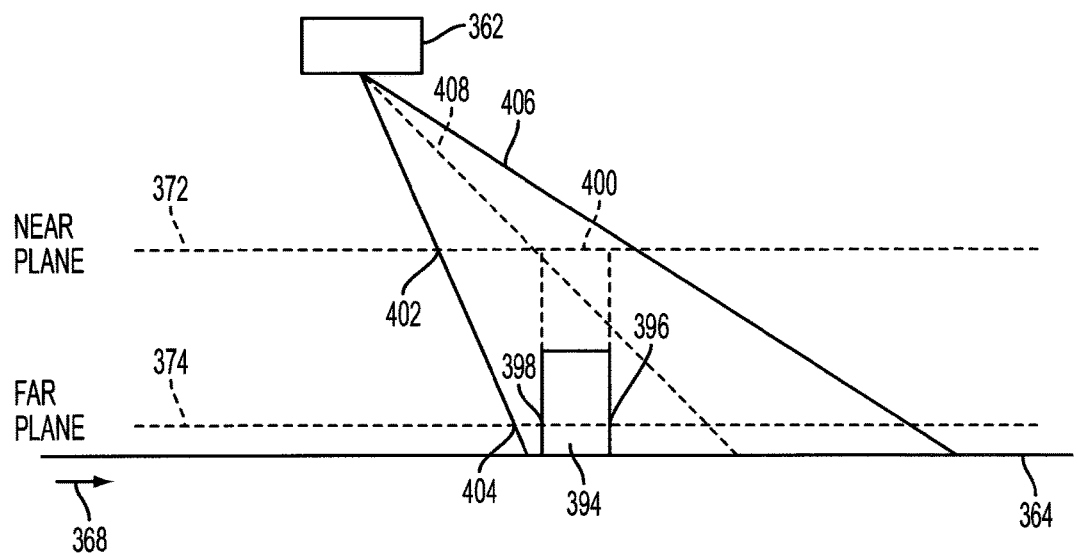
FIG. 11 is a schematic side elevation of an object within the field of view of the imager system of FIG. 7 according to a further embodiment of the present invention.

One advantage of this approach to object-code association is that it may also be used with both "top-forward"- and "top-backward"-facing imager systems, or imager systems that are configured to also process optical codes on the front or back faces of an object. In this regard, FIG. 11 is a schematic side elevation of object 394 and simulated object 400 within a field of view 406 of imager system 362 according to a further embodiment of the present invention. In this example, imager system 362 may be oriented in a top-backward fashion, such that its optical axis 408 is skewed from perpendicular by approximately 45°.

Based on the position of simulated object 400 in FIG. 11, the boundaries of the ROI in the y-axis direction will be defined by the formulas as explained above. As noted above, it may be the case that multiple objects are within the field of view of an imager system. Thus, for each image captured, the imager system would perform the steps above to determine an ROI for each object within its field of view (that is, for each object having a system object record in which Nlead and Ntrail indicate that the object is within the field of view). After the imager system determines one or more ROI(s) for object(s) within the field of view, a processor (for example, analogous to processor 290 described above) may execute an ROI extraction module to extract the ROI data from its image sensor. The processor may then execute a decoder module to process the ROI(s) and attempt to locate an optical code within each ROI.

It will be appreciated that, in some cases, the decoder module may not be able to locate and/or read an optical code on the first attempt. Preferably, the decoder module may be able to differentiate between the situation where an optical code was found in the ROI, but the optical code could not be read ("NoRead" situation), and the situation where an optical code was not found within the ROI, so analysis of a code was not attempted ("NoCode" situation). This information may be used to optimize the identification and reading of optical codes in subsequently captured images.

Figure 18:
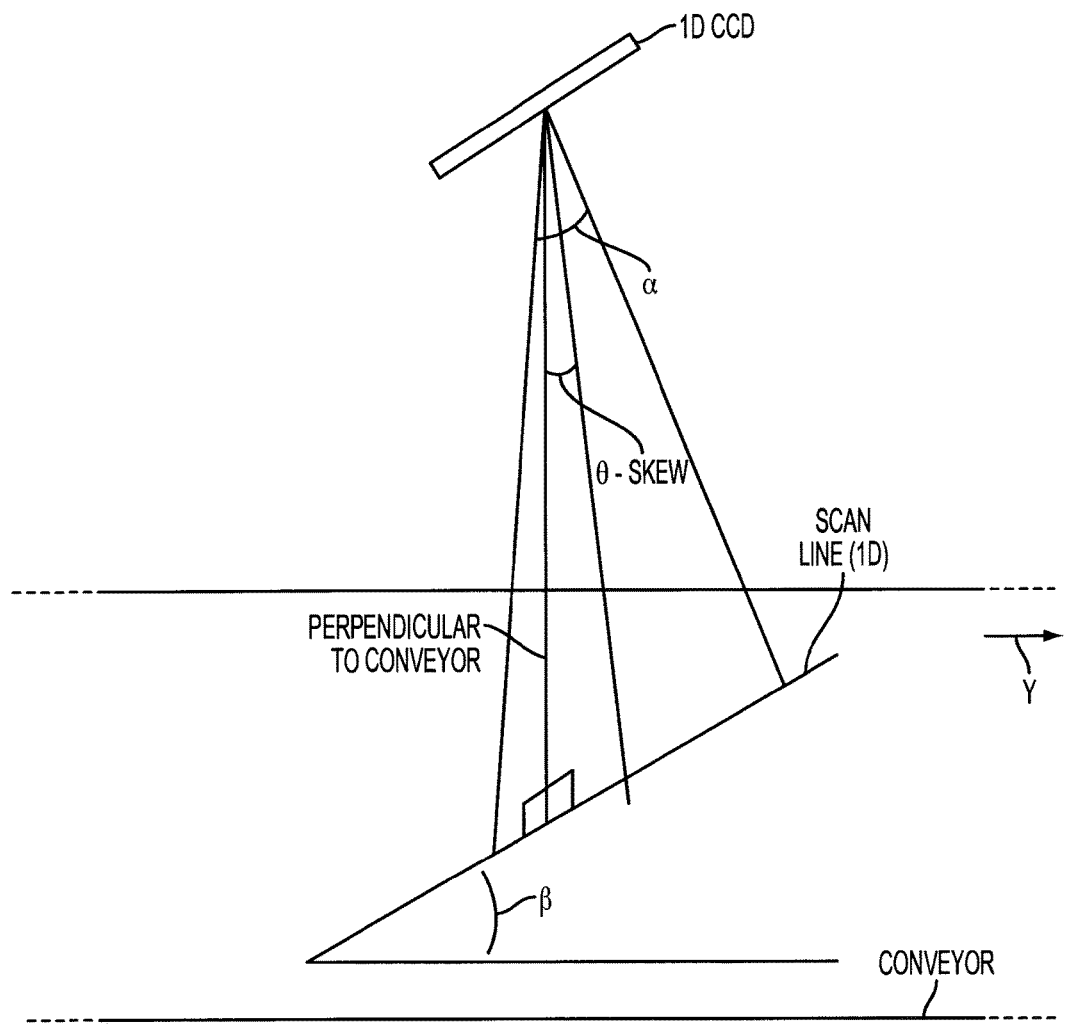
FIG. 18 is a schematic elevation of a field of view of an imager system according to an embodiment of the present invention.

In a still further embodiment, the two dimensional sensor is replaced by a linear CCD sensor that extends in the x-y plane at an angle β, for example 45°, with respect to the y direction. Such a sensor may be considered a subcase of a two-dimensional pixel sensor. The same dynamic ROI procedures and equations apply as described above, except that PIXtotVert=(the CCD sensor resolution in pixels)*(cos β), and skew angle θ=(CCD output optical angle)*(cos β). These angles are indicated in FIG. 18. In particular, if β=90°, this arrangement is the same as the two dimensional sensor, except with just a single column of detectors oriented in the y direction. The bounding of the resulting image by a ROI can be effected in the same manner as described herein with respect to an image with multiple y-directed columns. The single column arrangement can be useful, for example, where the codes expected on the objects vary linearly and are always aligned in the y direction, e.g. in industries (such as cigarettes and pharmaceuticals) in which barcodes are consistently and precisely aligned in the same orientation on all packaging.

Assume now an embodiment in which the sensor is a two dimensional detector array. When the processor determines PIXmin and PIXmax, it feeds these values to an input channel of the sensor control circuit, which may be part of the sensor integrated circuit or a separate circuit, as minimum and maximum row numbers. The sensor then uses the specified rows to output data only for the sensor rows including and otherwise between those limits. It will be understood that in an embodiment in which the ROI is defined in the x direction, similar limitations could be effected for the sensor columns. In an embodiment in which the system bounds the image through a software step, the processor instructs the sensor to output an image from the entire array, or possibly a predetermined subset of the array which is the normal default for the system's operation, to the processor. Upon receiving the data, the processor analyzes only that part of the image data corresponding to the ROI, in looking for an optical code. Recall that in an embodiment in which the sensor is a linear array, extending across the conveyor surface in the x direction, the sensor acquires image data by repeatedly taking linear images as the object moves beneath the imager, thereby creating a two dimensional image through accumulation of the linear images. In such an embodiment, the processor could bound the image through a hardware approach by controlling the timing of when the imager starts and stops acquiring linear images from the linear sensor. That is, given some value of PIXmin, and given that if PIXmin=0, the processor would control the imager to start acquiring linear images at time 0, if PIXmin=100, the processor delays the imager start until, given the image acquisition rate, approximately 100 pixels are skipped (which would otherwise have been obtained had the imager started at time 0) in the y direction. The processor then stops the sensor when the imager has acquired sufficient linear images from the start point so that the accumulated image has a pixel length in the y direction of PIXmax−PIXmin. Where it is desired to bound the image in the x direction, the processor would provide sufficient instructions to the sensor to deactivate desired detectors in the linear array. In an embodiment using a linear sensor in which the system bounds the image through a software step, the processor activates the sensor to acquire linear images for a predetermined normal period of time, and upon receiving the data, analyzes only that part of the image data corresponding to the ROI, in looking for an optical code. In an embodiment (as described above) in which a linear sensor extends across the conveyor surface at an acute angle in the x-y plane, and in which the processor repeatedly activates the sensor so that the processor receives individual linear image data sets and analyzes each set individually for optical codes, the processor could bound the image through a hardware approach by controlling the timing of when the imager starts and stops acquiring linear images from the linear sensor. That is, given some value of PIXmin, and given that if PIXmin=0, the processor would control the imager to start acquiring linear images at time 0, if PIXmin=100, the processor delays the imager start until, given the image acquisition rate, approximately 100 pixels are skipped (which would otherwise have been obtained had the imager started at time 0) in the y direction. The processor then stops the sensor when the imager has acquired sufficient linear images from the start point so that the accumulated image sets have a pixel length in the y direction of PIXmax−PIXmin.

As should be apparent from the present disclosure, the use of the dynamic ROI calculation allows the system to acquire images and locate optical codes effectively and quickly, without need of height information, or therefore of a device to detect and provide height information. It should be understood and as described above, however, that use of a dynamic ROI may be used in systems that utilize height or other dimensioning information, e.g. to increase the speed of such systems. For instance, the system as shown in FIG. 3 can be modified to include a vertical light curtain upstream of field of view 302 but downstream from photoeye 312. The distance (in tachometer pulses) between the photodetector and the light curtain are known, Thus, the system, upon setting up an object record, includes a variable with a value equal to Nlead+number of pulses needed to reach light curtain. At each tachometer pulse, the processor checks this variable in comparison with the current tachometer value. If the comparison between the tachometer value and the variable value indicates an object is adjacent the light curtain, then the system determines the object's height from the light curtain data and thereafter uses that height value for the predetermined maximum height (H) in the equations above. That is, the system dynamically determines ROI using a predetermined maximum height, but in this embodiment, the predetermined height is each object's actual height, determined before the object reaches the field of view. It should be understood that a light curtain can be used as the photosensor, so that this one component simultaneously performs the functions of presence detection and height detection, with the output from the light curtain being utilized by the system for both functions as described herein.

Once the next image is captured, the imager system may again determine one or more ROI(s) for each object within its field of view. (In this subsequent image, the ROI(s) will have shifted slightly as the corresponding object(s) will have traveled slightly downstream.) The processor may again execute the decoder module to process the new ROI(s). The imager system may preferably store in memory the boundaries of each ROI, and the pixel position of any located optical codes therein, for a number of previously captured images. For example, the imager system may store the ROI boundary information and optical code position information for the previous 100 images. However, the number of images stored may depend on user preference and memory usage limitations. In any event, if a previously processed ROI resulted in a NoRead situation, the imager system may preferably already know the pixel position of the located, but un-read optical code in the new ROI based on the stored information for the previous image and the amount by which the new ROI has shifted. This may further advantageously reduce the amount of time required to process a ROI and read an optical code. The system may discard the bad image while retaining information from an image/ROI from which the optical code was found, and then directly acquire and process the next image using a new ROI. Alternatively, the system could use the ROI information from the bad image, check if the newly acquired image provides a better result, and then apply a more computationally aggressive algorithm to improve the result.

Figure 12:
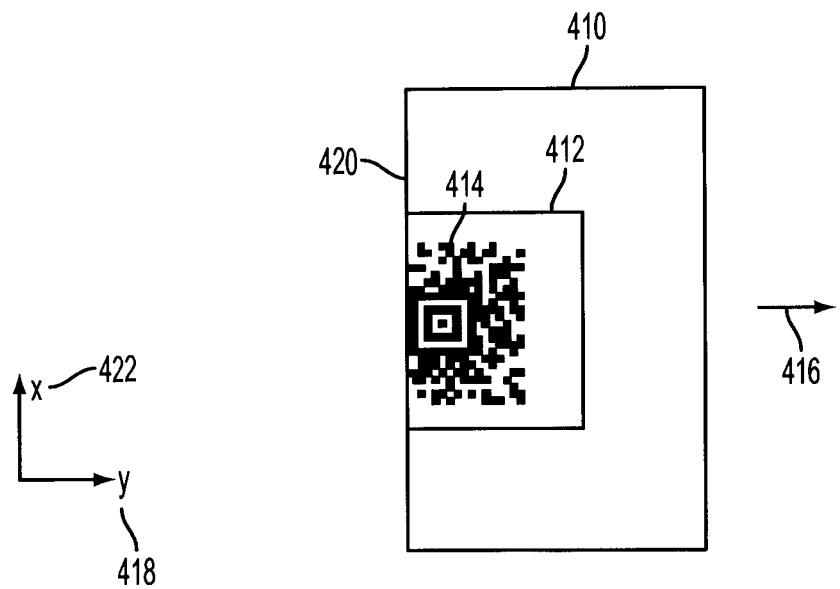
FIGS. 12 and 13 are regions of interest of first and second images respectively captured by an imager system according to an embodiment of the present invention.

Moreover, the imager system may discard (e.g., not process) a portion of a new ROI in a new image based on a portion of a previously processed ROI which was found not to contain an optical code. For example, FIG. 12 illustrates a ROI 410 of an image captured by an imager system. As shown, an object 412 having an optical code 414 on a top surface thereof is present within the ROI. Here, object 412 is traveling in a direction of travel 416 which may be parallel with y-axis 418. The length of ROI 410 in the y-axis 418 direction is preferably less than the length of the imager system's field of view in the y-axis 418 direction. The left side boundary 420 of ROI 410 is coincident with the upstream edge of the imager system's field of view in this example. The length of ROI 410 in the direction of x-axis 422 may be substantially equal to the length of the imager system's field of view in the x-axis 422 direction.

Figure 13:
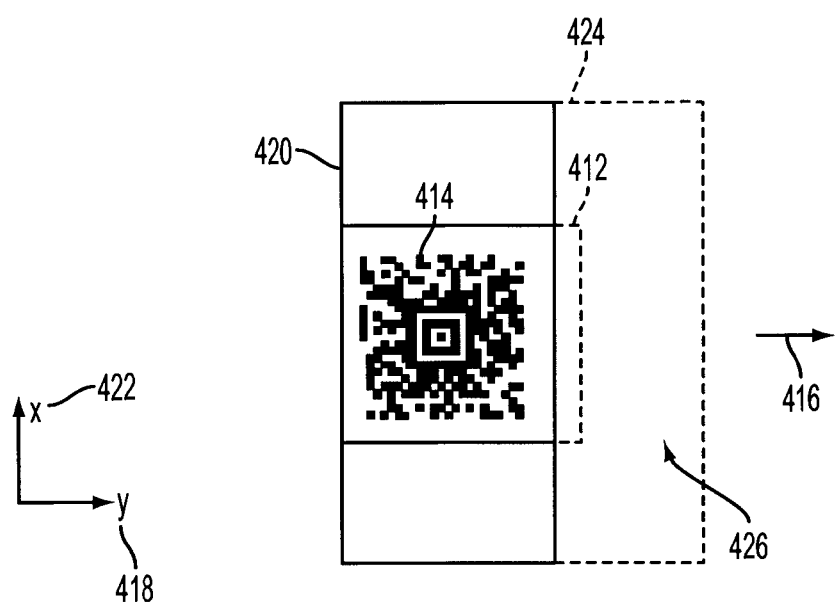

FIG. 13 is a ROI 424 of a subsequently-captured image, though multiple images may have elapsed between the images which resulted in ROIs 410 and 424. Object 412 and optical code 414 thereon are not fully within ROI 410 shown in FIG. 12. This indicates that, at the time the image was acquired, object 412 and optical code 414 were not yet fully within the field of view of the imager system. In FIG. 13, however, although object 412 is not fully within ROI 424, optical code 414 is. Thus, between the times that the image of which ROI 410 is a part and the image of which ROI 424 is a part were captured, object 412 has moved slightly downstream in the direction of travel 416, but has not fully entered the imager system's field of view. This is why ROI 424 has a longer length in the y-axis 418 direction than ROI 410.

When the imager system's processor executes the decoder module and processes ROI 410, it may have determined that the right portion of ROI 410 did not contain any optical code and that the left portion contained an optical code that could not be read. The pixel information associated with the NoCode and NoRead situations is preferably stored. Thus, when the imager system's processor executes the decoder module to process ROI 424, it may discard a portion 426 of ROI 424 shown in dashed lines in FIG. 13 which are known not to have any optical code, for example based on the previously stored pixel information associated with the NoCode situation and the relative positions of ROIs 424 and 410. Decreasing the size of ROI 424 may additionally reduce the amount of time required to process ROI 424 and read optical code 414.

According to a further embodiment, a method of determining one or more ROI(s) within a captured image is particularly suited for sorting of luggage, for example at airports. In this embodiment, a user may predefine a safety factor which is applied to each to the ROI determined for each object. For example, the safety factor may increase the length of the ROI in the y-axis direction beyond the length it would otherwise be by a small amount. By slightly increasing the size of the ROI(s), this may allow an imager system to identify and read optical codes which are attached to luggage, for example by a luggage tag that may extend beyond the immediate boundaries of the luggage object, rather than being adhered or fixed to the luggage. It will be appreciated that this embodiment may also be useful where a user expects the objects to be scanned to have irregular shapes.

If the decoder module is able to identify and decode an optical code within an ROI, the processor may then execute a code association module to assign the optical code to its corresponding object. In one embodiment, as described above, each ROI may correspond only to a single object. Thus, an imager system may associate each ROI in each image with its corresponding object, for example by storing this information in memory or by updating the proper object record. Because the optical code was located within a ROI which corresponds to a single object, the processor may assign the optical code (or the information decoded therefrom) to the object on which the ROI was based.

Figure 14:
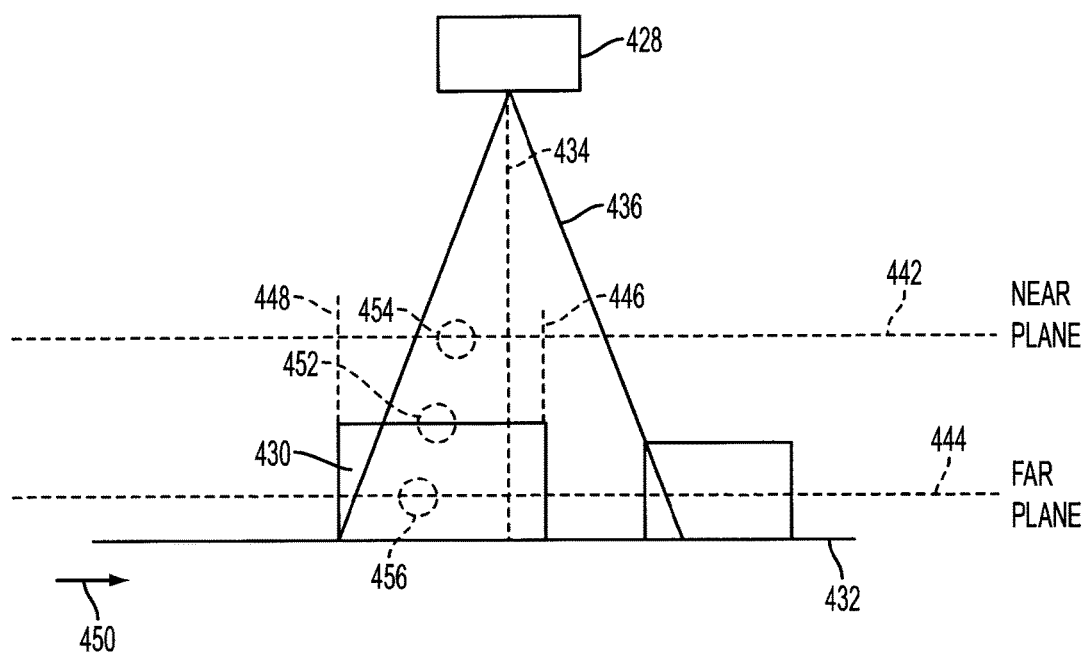
FIGS. 14 and 15 are schematic elevations of an imager system configured to assign an optical code to an object traveling on a conveyor system according to a further embodiment of the present invention.
Figure 15:
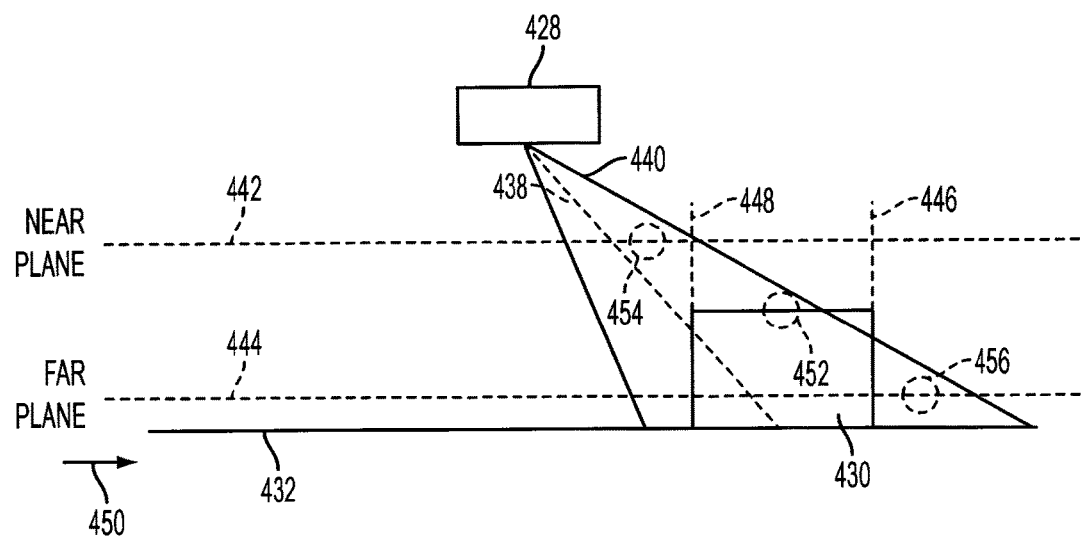

According to a further embodiment, a different method may be used to assign an optical code to its corresponding object. This method, described below with respect to FIGS. 14 and 15, may be used as an alternative to the method above or in addition thereto, for example to gain further confidence that a detected optical code is assigned to its corresponding object. In this regard, FIGS. 14 and 15 are schematic elevations of an imager system 428 configured to assign an optical code to an object 430 traveling on a conveyor system 432. Imager system 428 and conveyor system 432 are preferably analogous to imager system 100 and conveyor system 140 described above.

In FIG. 14, an optical axis 434 of imager system 428 may have a skew of θ=0°, and imager system 428 may have a field of view 436. In FIG. 15, on the other hand, an optical axis 438 of imager system 428 may have a skew of θ=45°, and imager system 428 may have a field of view 440. It will be appreciated, however, that the present description is applicable to imager systems having any skew angle. With respect to imager system 428 in both figures, there are preferably defined a near plane 442 and a far plane 444. Further, as with imager system 362 described above, imager system 428 may preferably know the position, in linear units (e.g., inches or millimeters) in the imager system 362 frame of reference, of the leading edge 446 and the trailing edge 448 of object 430 along the direction of travel 450 (e.g., the y-axis direction described above). For example, imager system 428 may know this information based on information continuously transmitted to it from a tachometer and a position sensor, as described above. The position values of leading edge 446 and trailing edge 448 are variable and continuously updated as object 430 travels through the system or only when, based on the number of tachometer pulses, the system expects the first object to enter the imager's field of view.

Finally, object 430 may preferably have an optical code 452 associated therewith, for example on a top surface thereof. In FIGS. 14 and 15, which are side elevations, optical code 452 itself is not visible. Rather, the position of optical code 452 on object 430 along the y-axis direction is identified by a dashed circle.

In this embodiment, when the decoder module identifies and is able to read an optical code, such as optical code 452, imager system 428 may know the position (for example, in pixels) of optical code 452 in the image frame of reference. Further, imager system 428 may preferably have been calibrated as described above such that it knows a geometric transformation which may be applied to a position within an image to obtain the same position in the frame of reference of imager system 428, specifically within both near plane 442 and far plane 444. To assign an optical code to its corresponding object, a processor of imager system 428 may execute a code association module. Thus, the processor may apply the geometric transformations to the position of optical code 452 in the image frame of reference to obtain its position 454 in near plane 442 and to obtain its position 456 in far plane 444. Positions 454 and 456 are also identified by dashed circles in these figures.

The processor may then compare the y-axis positions 454 and 456 of optical code 452 in near and far planes 442, 444 to the y-axis positions of leading edge 446 (Plead) and trailing edge 448 (Ptrail) to determine whether optical code 452 should be considered to be associated with object 430. More particularly, the processor may determine whether at least one of the following four expressions is satisfied to determine whether optical code 452 should be associated with object 430:

$$P_{near} < P_{lead} \&\& P_{near} > P_{trail}$$

$$P_{far} < P_{lead} \&\& P_{far} > P_{trail}$$

$$P_{near} < P_{trail} \&\& P_{far} > P_{lead}$$

$$P_{far} < P_{trail} \&\& P_{near} > P_{lead}$$

In these expressions, $P_{near}$ is the position of the optical code in near plane 442, $P_{far}$ is the position of the optical code in far plane 444, $P_{lead}$ is the position of the object's leading edge, and $P_{trail}$ is the position of the object's trailing edge. Because these expressions compare the positions of the optical code and the object only along the y-axis direction, the height of the optical code (e.g., in the z-axis direction) does not matter. Importantly, for this embodiment, all of the y-coordinates are referenced to the same absolute (conveyor or camera) system.

Assuming that objects within the system are spaced apart in the y-axis direction by at least the minimum gap, if at least one of these conditions is satisfied, then the processor may associate the optical code (or the decoded information therefrom) to the object. For example, in FIG. 14, the first and second expressions above are satisfied, as position 454 is less than leading edge 446 and position 454 is greater than trailing edge 448, and position 456 is less than leading edge 446 and position 456 is greater than trailing edge 448. On the other hand, in FIG. 15, the third expression above is satisfied. Specifically, position 454 is less than trailing edge 448 and position 456 is greater than leading edge 446. In both figures, then, the processor may associate optical code 452 with object 430. If none of the expressions are satisfied, the system issues a "not assigned" error message. This procedure provides redundancy to the ROI calculations described above. If none of the expressions are satisfied, an error may have occurred (e.g. in the operation of the presence/height sensors or in maintenance of the minimum gap), and the system operator may choose to make a manual intervention.

Figure 16:
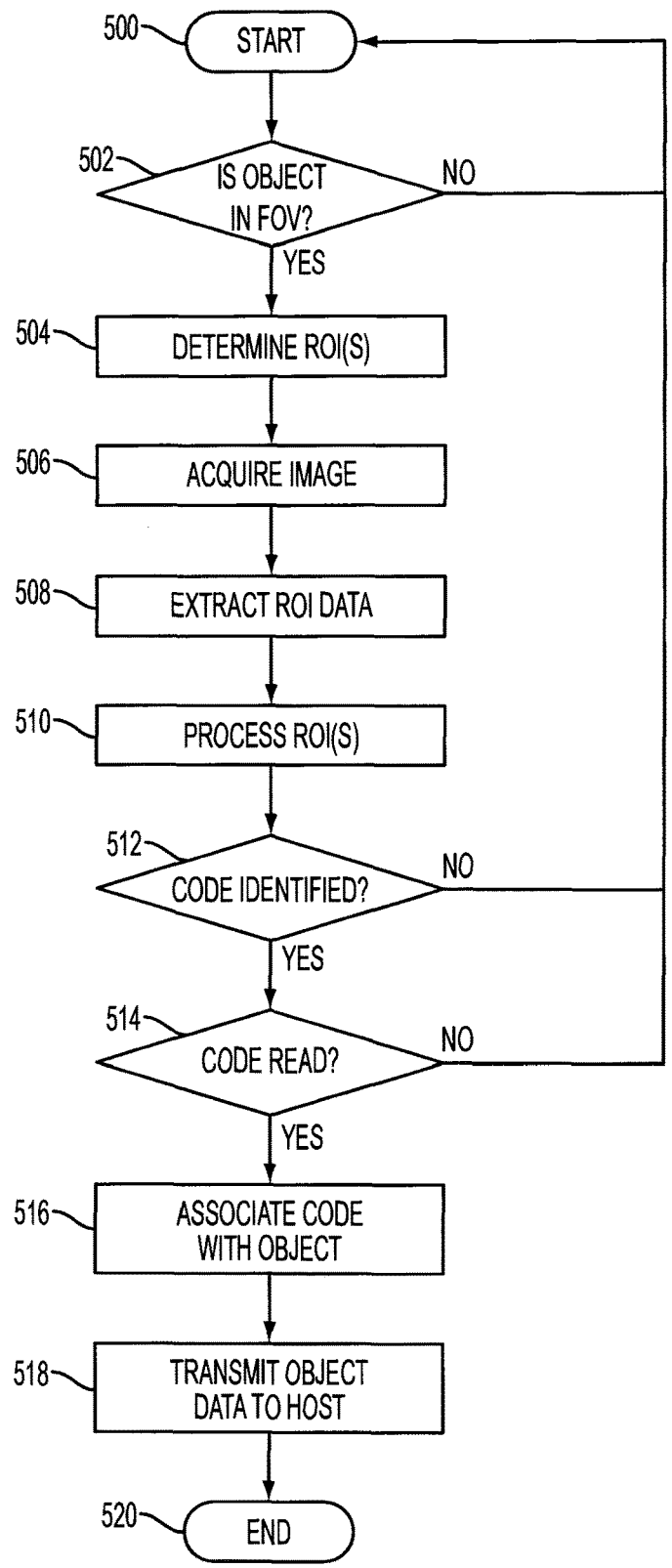
FIG. 16 is a flow diagram illustrating steps of a method of assigning an optical code to an object according to an embodiment of the present invention.

FIG. 16 is a flow diagram illustrating steps of a method of assigning an optical code to an object according to an embodiment of the present invention. In a preferred embodiment, the steps described with reference to FIG. 16 may be performed by a processor of imager system, such as either processors 150 or 290 described above, separately or in conjunction. In other embodiments, however, some or all of these steps may be performed at a host system, such as host 220 described above. In any case, prior to the method being performed, either a user or the imager system may have determined a minimum object gap as described above. The user may then ensure that objects to be processed by the imager system are appropriately spaced. Further, the user may preferably have calibrated the imager system as described above.

The process starts (step 500) and the imager system may first determine whether at least one object is within its field of view (step 502). As explained above, the imager system preferably knows the position of each object, including the positions of the leading and trailing edges thereof, to be imaged based on information transmitted to it by a tachometer (or clock) and a position encoder. If no objects are within the imager system's field of view, the process returns to step 500.

Next, if at least one object is within the imager system's field of view, the imager system may determine one or more ROI(s) and updates all, or relevant, $P_{lead}$ and $P_{trail}$ values (step 504). If two objects are within the imager system's field of view, for example, the imager system may determine two different ROIs based on the formulas described above. Once the relevant number of ROI(s) have been determined, the imager system may acquire an image via an imager described above (step 506). In one embodiment, the imager may acquire an image encompassing the entire field of view of the imager system. In other embodiments, the imager may use windowing techniques to acquire an image only of the relevant ROI(s). A processor of the imager system may then extract the ROI data from the image sensor of the imager (step 508).

The processor may then process each ROI from the image (step 510). In particular, the processor may execute a decoder module to identify and read optical codes within each ROI. For each ROI, the processor may determine whether an optical code was identified, i.e. it was localized at a position in the image (step 512). If not, the processor may store information regarding the pixel locations which did not contain an optical code, as described above. This information may be useful in increasing the processing speed of a subsequent search for an optical code. The process would then return to step 500. If an optical code is identified/localized, the processor may determine whether it can be read (step 514). If it cannot be read, the processor may store information regarding the pixel location of the optical code, which again may be useful in increasing the processing speed of a subsequent attempt to read the optical code. The process would then return to step 500.

If the optical code can be read, the processor may then attempt to associate the optical code (and/or the information stored therein) with its corresponding object (step 516). The processor may execute a code association module which may use either or both of the methods described above to associate an optical code with its corresponding object. The processor may also update an object record associated with the object with the information stored in the optical code. When the object reaches the predetermined system transmit point, the processor may transmit data associated with the object (for example including the updated object record) to a host system (step 518). Finally, the process ends (step 520). If association cannot be performed, an error message is issued to the processor, which can be handled in various known ways, e.g. by diverting the box from the conveyor line and requiring any labeling on the box to be read manually.

Figure 17:
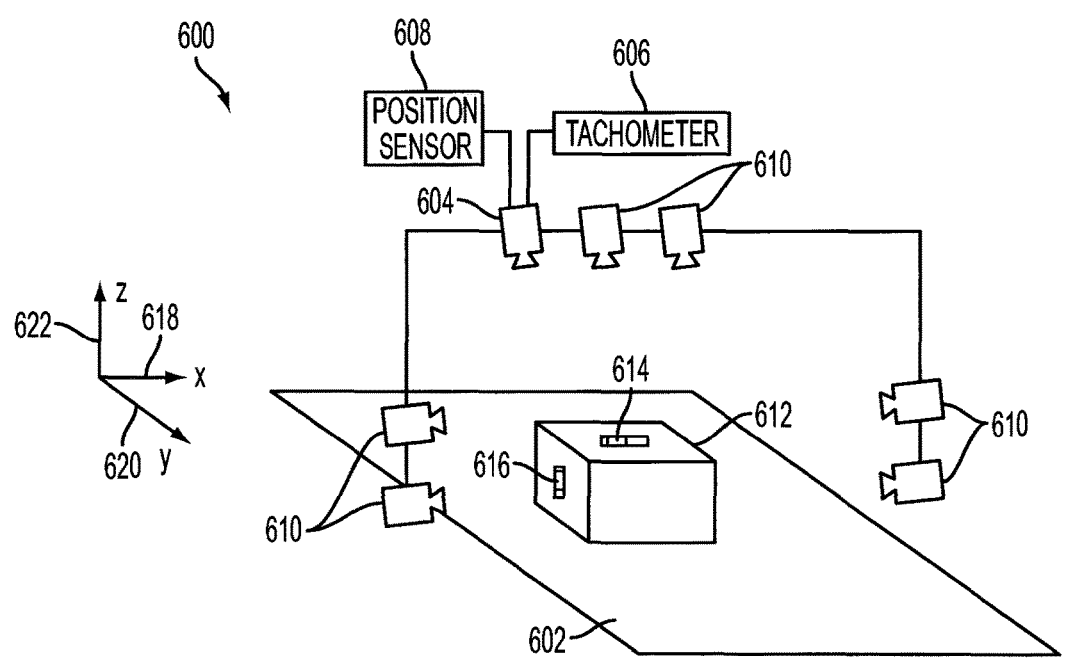
FIG. 17 is a schematic perspective view of a networked cluster of imager systems configured for use with a conveyor system according to an embodiment of the present invention.

Referring now to FIG. 17, embodiments of the present invention may also be used with arrangements in which two or more imager systems are networked together. As those of skill in the art will appreciate, some applications may require that more than one imager system be used to identify and read optical codes within a larger field of view than that of a single imager system. In addition, some applications may require the use of more than one imager system to identify and read optical codes on more than one (and, in fact, up to six) sides of an object. In this regard, FIG. 17 is a schematic perspective view of a networked cluster 600 of imager systems configured for use with a conveyor system 602 according to an embodiment of the present invention.

In one embodiment, cluster 600 comprises a master imager system 604, which may preferably be analogous to imager system 100 described above, which is in electronic communication with a tachometer 606 and a position sensor 608. Cluster 600 may further comprise a plurality of slave imager systems 610, which may also preferably be analogous to imager system 100 in many respects, which may preferably be in wired or wireless electronic communication with master imager system 604. For example, master imager system 604 may be electronically coupled with slave imager systems 610 through one or more network interfaces analogous to interface 200 described above. Thus, master imager system 604 may exchange with any of slave imager systems 610 any type of applicative message. In FIG. 17, six such slave imager systems 610 are shown, though any number of slave imager systems 610 may be used. Imager systems 604 and 610 are preferably fixed with respect to conveyor system 602, for example by being coupled with a suitable frame or other mounting structure.

As shown, two slave imager systems 610 may be oriented in a downward-looking fashion over conveyor system 602, and two slave imager systems 610 may be positioned on both sides of conveyor system 602. Thus, imager systems 604 and 610 may be configured to identify and locate optical codes on multiple sides of an object, such as object 612 which may have optical codes 614 and 616 on top and side surfaces thereof, respectively. In other embodiments, cluster 600 may further comprise a slave imager system 610 located beneath conveyor system 602 to identify and read optical codes on a bottom surface of an object 612. It should be understood, in view of the present disclosure, that all the imagers of FIG. 17 can make use of dynamic ROI's as described above to speed up, code, search, and decode.

Preferably, each imager system 604, 610 may be calibrated using the above-described procedure. Thus, each imager system 604, 610 may preferably determine one or more geometric transformations which enable it to transform a position within its image frame of reference to a global frame of reference, which may be defined with respect to the position sensor, for example. In FIG. 17, the global frame of reference may comprise an x-axis 618, oriented perpendicular to the direction of travel of conveyor system 602, a y-axis 620, oriented parallel to the direction of travel, and a z-axis 622, oriented perpendicular to both x-axis 618 and to y-axis 620.

Additionally, it is preferred that data transmitted from tachometer 606 to master imager system 604 be synchronized across all slave imager systems 610. Thus, for example, the pulse series from tachometer 606 may be passed from master imager system 604 to slave imager systems 610. Alternatively, pulses from tachometer 606 can be fed directly to all imagers, and the master only synchronizes the signal, so that the encoder pulse count is aligned for all imagers. It is further preferred that data from position sensor 608 be synchronized across all slave imager systems 610. Therefore, signals from position sensor 608 representative of the leading and trailing edges of an object which are transmitted to master imager system 604 may also be passed to slave imager systems 610. Thus, slave imager systems 610 may also know the position of the leading and trailing edges of objects traveling on conveyor system 602.

According to one embodiment, each imager system 604, 610 may attempt to read and identify optical codes within its respective field of view, but only master imager system 604 may perform object-code association. In particular, each slave imager system 610 may process each package which passes into its respective field of view to identify and read optical codes as described above. Where a slave imager system 610 identifies and reads an optical code, it may use the relevant geometric transformation to obtain the position of the optical code in the global frame of reference. Slave imager system 610 may then send the information associated with the optical code to master imager system 604 along with the position of the optical code in the global frame of reference and the tachometer value at the time of reading.

Master imager system 604 may collect all information regarding optical codes from slave imager systems 610 and may also attempt to identify and read any optical codes on objects within its local field of view. Master imager system 604 may then use the information from slave imager systems 610 regarding the position of any identified optical codes to associate the optical codes (and/or the information encoded therein) with their corresponding objects. Again, master imager system 604 may use either of the methods described above for object-code association. Moreover, master imager system 604 may also associate any optical codes it reads with objects within its field of view. Master imager system 604 may then perform required result collection and analysis for each object, for example updating the object record associated with each object. Finally, once a relevant object reaches the predetermined system transmit point, master imager system 604 may transmit the object record associated with and/or other information regarding that object to a host system.

According to a further embodiment, both master imager system 604 and slave imager systems 610 may perform both processing of optical codes and object-code association. In this embodiment, slave imager systems 610 may identify and read an optical code, associate that optical code with its corresponding object, and send the optical code (and/or the information encoded therein) and information regarding the object with which it is associated to master imager system 604. Master imager system 604 may identify and read optical codes associated with objects within its local field of view and associate the optical codes with their corresponding objects. Master imager system 604 may further collect all information from slave imager systems 610 regarding optical codes identified, read, and associated at those specific systems. Master imager system 604 may then perform required result collection and analysis for each object, for example updating the object record associated with each object. Finally, once a relevant object reaches the predetermined system transmit point, master imager system 604 may transmit the object record associated with and/or other information regarding that object to a host system.

It can thus be seen that the present invention provides a novel imager system. While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

The invention claimed is:

1. An imaging system, comprising:
 a frame;
 a conveyor system having a generally planar conveyor surface that is movable with respect to the frame in a direction of travel, the conveyor surface operative to convey an object in the direction of travel, wherein the object has an optical code associated therewith; and
 at least one imager system in a position with respect to the frame that is fixed during movement of the conveyor surface in said direction of travel,
 the at least one imager system comprising
  an image sensor comprising an array of optical detectors,
  optics configured to focus light reflected from a field of view onto the image sensor, and
  a processor,
  wherein the image sensor is configured to output to the processor data representative of an image of the field of view,
 wherein the conveyor system outputs at least one signal representative of a position of the object with respect to the field of view, and
 wherein the processor is configured to
  receive the at least one signal representative of a position of the object with respect to the field of view,
  determine a position of the object with respect to said field of view based on the at least one signal;
  upon determining that the object is within the field of view, and based upon a predetermined distance between the object and the optics, define a region that bounds the data representative of the image at least with respect to the direction of travel and that encompasses a position the object would have in the data representative of the image if the object is at the determined position in the field of view and at the predetermined distance from the optics.

2. The system of claim 1, wherein the processor is configured to define the region by determining a position the object would have if the object is at the determined position in the field of view and at the predetermined distance from the optics and determining a projection to the sensor of said position the object would have.

3. The system of claim 1, wherein the conveyor system comprises a dimension detector disposed upstream, with respect to the direction of travel, of the field of view, wherein the dimension detector outputs a signal to the imager system representative of a dimension of the object with respect to a predetermined reference when the object is between the predetermined reference and the optics, so that the predetermined distance corresponds to the dimension.

4. The system of claim 3, wherein the predetermined reference is the conveyor surface or an edge of the conveyor surface.

5. The system of claim 1, wherein at least one of the conveyor system and the imager system comprises memory, wherein the predetermined distance is stored in the memory.

6. The system of claim 1, wherein the processor defines the region for a plurality of said objects based on the same said predetermined distance.

7. The system of claim 1, wherein the processor updates the region as said object moves through the field of view.

8. The system of claim 1, wherein the conveyor system is configured to repeatedly output the at least one signal, so that the processor repeatedly determines the position of the object with respect to the field of view, and wherein the processor updates the region for successive data representative of the image, as said object moves through the field of view.

9. The system of claim 1, wherein the conveyor system comprises a tachometer in communication with the conveyor surface so that the tachometer increments with movement of the conveyor surface, and wherein the at least one signal comprises an output of the tachometer.

10. The system of claim 1, wherein the conveyor system comprises a detector in a fixed position with respect to the conveyor system, wherein the detector is configured to detect presence of the object with respect to a predetermined position in the direction of travel, and wherein the at least one signal comprises an output of the detector.

11. The system of claim 10, wherein the detector is configured to determine a position of a leading edge and a trailing edge of said object with respect to said field of view.

12. The system of claim 11, wherein the region is defined in by respective maximum and minimum image data output values from the sensor, with respect to the direction of travel.

13. The system of claim 12, wherein the maximum image data value is based on a position of the leading edge, and the minimum image data value is based on a position of the trailing edge, with respect to the field of view in the direction of travel.

14. The system of claim 1, wherein the conveyor system is configured so that the conveyor surface moves at a generally constant speed, and wherein the at least one signal comprises a time stamp.

15. The system of claim 1, wherein the processor is configured to bound the data representative of an image data by the region and analyze the data within the region to detect an optical code.

16. The system of claim 1, wherein the processor is configured to associate information stored in the detected optical code with said object and update an object record stored in memory and associated with the detected optical code.

17. A method of imaging objects on a conveyor system, wherein the conveyor system comprises a generally planar conveyor surface that is movable with respect to a frame in a direction of travel, the planar surface being operative to convey an object in the direction of travel, wherein the object has an optical code associated therewith and is spaced from other said objects in the direction of travel by a minimum gap, the method comprising the steps of:
providing at least one imager system in a position with respect to the frame that is fixed during movement of the conveyor surface in the direction of travel, wherein the imager system comprises
an image sensor comprising an array of optical detectors,
optics configured to focus light reflected from a field of view onto said image sensor, and
a processor,
wherein the image sensor configured to output to the processor data representative of an image of said field of view,
wherein the conveyor system is configured to output at least one signal representative of a position of the object with respect to the field of view;
receiving at said processor the at least one signal representative of a position of the object with respect to the field of view;
determining a position of the object with respect to the field of view based on the at least one signal;
upon determining that the object is within the field of view, and based upon a predetermined distance between the object and the optics, defining a region that bounds the data representative of the image at least with respect to the direction of travel, and that encompasses a position the object would have in the data representative of the image if the object is at the determined position in the field of view and at the predetermined distance from the optics.

18. The method of claim 17, further comprising the steps of:
acquiring data representative of an image from the image sensor of said imager system;
extracting from said data representative of said image data corresponding to the region;
analyzing said data corresponding to said region to identify and read an optical code; and
associating said optical code with said object.

19. The system of claim 1, wherein the image sensor is disposed with respect to the conveyor system so that the field of view extends above the conveyor surface and has a length in the direction of travel that varies with distance from the optics.

20. The system as in claim 19, wherein the processor system comprises a length of the region in the direction of travel to a predetermined maximum length and, if the length of the region is greater than the predetermined maximum length, adjusts the length of the region to the predetermined maximum length.

21. The system as in claim 20, wherein the processor system with respect to said object, bounds the image data by the region, and analyzes the image data within the region to detect an optical code.

22. A system for acquiring image data for detection of optical codes located on objects carried by a conveyor system, comprising:
a conveyor system comprising:
a frame, and
a conveyor that defines a generally planar conveyor surface that is movable with respect to the frame in a direction of travel,
wherein the conveyor system outputs a first signal that corresponds to movement of the conveyor surface in the direction of travel;
a detector disposed with respect to the conveyor system so that the detector detects presence of an object being carried by the conveyor surface in the direction of travel, the detector outputting a second signal carrying information indicating presence of the object;

an imager comprising:
- a sensor, and
- an optics arrangement disposed with respect to the sensor to direct light from a field of view to the sensor so that the sensor outputs image data,
- wherein the imager is disposed with respect to the conveyor system so that the field of view extends above the conveyor surface and has a length in the direction of travel that varies with distance from the optics; and a processor system that receives the image data, the first signal, and the second signal, wherein the processor system:
- based on the first signal and the second signal, determines a position of said object in the field of view with respect to the direction of travel,
- based upon the position of the object in the field of view, and upon a predetermined distance between the object and the optics, determines a position said object would have in the field of view and at the predetermined distance from the optics, defines a region corresponding to a projection to the sensor of the position the object would have in the field of view and at the predetermined distance, bounds the image data to the region at least with respect to the direction of travel, and analyzes the bounded image data within the region to detect an optical code.

23. The system as in claim 22, wherein the processor system defines the region by determining a projection onto the sensor of an area that a planar surface of the object would occupy at a minimum distance and at the determined position.

24. The system as in claim 22, wherein the conveyor surface is generally planar and wherein the imager is disposed with respect to the conveyor system so that an optical axis of the optics is disposed in a plane generally perpendicular to a plane of the conveyor surface.

25. The system as in claim 22, wherein the conveyor surface is generally planar and wherein the imager is disposed with respect to the conveyor system so that an optical axis of the optics is disposed in a plane generally parallel to the conveyor surface.

26. The system as in claim 22, wherein the processor system bounds the image data by selectively activating a portion of the sensor that corresponds to the region, so that the processor system receives the image data only from the selectively activated portion, said selectively activated portion of the sensor corresponding to the region.

27. The system as in claim 22, wherein the processor system receives the image data from the entirety of the sensor and bounds the image data by selecting a subset of said received image data corresponding to the region.

28. The system as in claim 22, wherein the imager system comprises a height detector upstream from the field of view, with respect to the travel direction, and wherein, with respect to an object, the height detector provides actual height data to the processor system as the predetermined distance, so that the predetermined distance is the actual height.

29. The system as in claim 22, wherein the conveyor system comprises a tachometer that is disposed in operative communication with the conveyor surface and that outputs the first signal, or a clock that outputs the first signal.

* * * * *